US012628113B2

(12) United States Patent
Barbu et al.

(10) Patent No.: US 12,628,113 B2
(45) Date of Patent: May 12, 2026

(54) POSITIONING

(71) Applicant: Nokia Technologies Oy, Espoo (FI)

(72) Inventors: Oana-Elena Barbu, Aalborg (DK);
Benny Vejlgaard, Aalborg (DK);
Johannes Harrebek, Aalborg (DK);
Ryan Keating, Naperville, IL (US)

(73) Assignee: Nokia Technologies Oy, Espoo (FI)

( * ) Notice: Subject to any disclaimer, the term of this
patent is extended or adjusted under 35
U.S.C. 154(b) by 323 days.

(21) Appl. No.: 18/580,036

(22) PCT Filed: Aug. 30, 2021

(86) PCT No.: PCT/US2021/048207
§ 371 (c)(1),
(2) Date: Jan. 17, 2024

(87) PCT Pub. No.: WO2023/033784
PCT Pub. Date: Mar. 9, 2023

(65) Prior Publication Data
US 2024/0323897 A1      Sep. 26, 2024

(51) Int. Cl.
*H04W 64/00*      (2009.01)
*G01S 5/02*      (2010.01)
*H04L 5/00*      (2006.01)

(52) U.S. Cl.
CPC ........... *H04W 64/00* (2013.01); *G01S 5/0236*
(2013.01); *H04L 5/005* (2013.01)

(58) Field of Classification Search
CPC ..... H04W 64/00; H04W 76/27; H04W 88/18;
H04W 4/02; G01S 5/0236; G01S 5/0009;

G01S 5/0205; H04L 5/005; H04L 27/261;
H04L 5/001; H04L 5/0023; H04L 5/0069;
H04L 5/0078; H04L 5/0048;
(Continued)

(56) References Cited

U.S. PATENT DOCUMENTS

| | | | |
|---|---|---|---|
| 10,422,886 B1 | 9/2019 | Krishnareddy et al. | |
| 11,310,816 B2 * | 4/2022 | Manolakos | ............. H04W 4/02 |
| 2008/0232297 A1 | 9/2008 | Mizugaki et al. | |

(Continued)

FOREIGN PATENT DOCUMENTS

| | | |
|---|---|---|
| WO | 2012/116972 A1 | 9/2012 |
| WO | 2015/155411 A1 | 10/2015 |

OTHER PUBLICATIONS

"Revised WID on NR Positioning Enhancements", 3GPP TSG RAN
Meeting #91e, RP-210903, Agenda: 9.7.25, Intel Corporation, Mar.
16-26, 2022, 6 pages.

(Continued)

*Primary Examiner* — Kabir A Timory
(74) *Attorney, Agent, or Firm* — Barta Jones, PLLC

(57) ABSTRACT

Certain examples of the present disclosure relate to an
apparatus (110) comprising means for: receiving Ultra-
Wideband, UWB, Reference Signal, RS, configuration
information (503), wherein the UWB RS configuration
information comprises information for configuring a trans-
mission or a reception of a UWB RS 508 by the apparatus
(110) to or from at least one node of a Radio Access
Network, RAN 120; and based at least in part on the
received UWB RS configuration information (503), causing
transmission or reception of the UWB RS 508 to or from the
at least one node of the RAN 120.

20 Claims, 7 Drawing Sheets

(58) Field of Classification Search
CPC ........ H04L 5/0091; H04B 2201/71634; H04B
1/717; H04J 11/00
See application file for complete search history.

(56) References Cited

U.S. PATENT DOCUMENTS

| | | | |
|---|---|---|---|
| 2017/0123045 A1* | 5/2017 | Shin ..................... | G01S 5/0081 |
| 2018/0035256 A1 | 2/2018 | Prevatt | |
| 2019/0191401 A1 | 6/2019 | Harada et al. | |
| 2020/0107164 A1 | 4/2020 | Lopatin et al. | |
| 2020/0314793 A1* | 10/2020 | Kumar ................... | G01S 19/48 |
| 2021/0067915 A1 | 3/2021 | Mao et al. | |
| 2022/0361137 A1* | 11/2022 | Baek ..................... | G01S 5/0072 |

OTHER PUBLICATIONS

"IEEE 802.15.4a", Wikipedia, Retrieved on Feb. 26, 2024, 2024, Webpage available at : https://en.wikipedia.org/wiki/IEEE_802.15.4a.

"IEEE 802.15.4", Wikipedia, Retrieved on Feb. 26, 2024, 2024, Webpage available at : https://en.wikipedia.org/wiki/IEEE_802.15.4.

Dachs, "UWB: A reborn standard for high-accuracy location services", 5G Technology World, Sep. 11, 2020, 11 pages.

Efatmaneshnik et al., "A Fast Multidimensional Scaling Filter for Vehicular Cooperative Positioning", The Journal of Navigation, vol. 65, No. 2, Mar. 12, 2012, pp. 223-243.

"IEEE 802.15", Wikipedia, Retrieved on Feb. 26, 2024, Webpage available at : https://en.wikipedia.org/wiki/IEEE_802.15.

"3rd Generation Partnership Project; Technical Specification Group Radio Access Network; NR; Physical layer procedures for data (Release 16)", 3GPP TS 38.214, V16.5.0, Mar. 2021, pp. 1-171.

"3rd Generation Partnership Project; Technical Specification Group Radio Access Network; LTE Positioning Protocol (LPP) (Release 16)", 3GPP TS 37.355, V16.4.0, Mar. 2021, pp. 1-298.

"3rd Generation Partnership Project; Technical Specification Group Radio Access Network; Study on NR positioning support (Release 16)", 3GPP TR 38.855, V16.0.0, Mar. 2019, pp. 1-197.

"Further discussion of NR Hybrid Positioning Techniques", 3GPP TSG RAN WG1 Meeting #96, R1-1901984, Agenda: 7.2.10.2, CATT, Feb. 25-Mar. 1, 2019, pp. 1-5.

"Revised SID: Study on NR positioning support", 3GPP TSG RAN Meeting #81, RP-182155, Agenda: 9.3.18, Intel Corporation, Sep. 10-13, 2018, 6 pages.

Khajenasiri et al., "A Low-Energy Ultra-Wideband Internet-of-Things Radio System for Multi-Standard Smart-Home Energy Management", IEIE Transactions on Smart Processing and Computing, vol. 4, No. 5, Oct. 2015, pp. 354-365.

Adebomehin et al., "Ultra-wideband signals for high-resolution cognitive positioning techniques in 5G wireless", IEEE 37th Sarnoff Symposium, Sep. 19-21, 2016, 2 pages.

Carfano et al., "Impact of FR1 5G NR Jammers on UWB Indoor Position Location Systems", International Conference on Indoor Positioning and Indoor Navigation (IPIN), Sep. 30-Oct. 3, 2019, 8 pages.

International Search Report and Written Opinion received for corresponding Patent Cooperation Treaty Application No. PCT/US2021/048207, dated Dec. 1, 2021, 12 pages.

Extended European Search Report received for corresponding European Patent Application No. 21956217.0, dated Apr. 9, 2025, 9 pages.

Zhang et al., "A Novel Timing Jitter Resist Method in UWB Systems", IEEE International Symposium on Communications and Information Technology, Oct. 12-14, 2005, pp. 806-809.

Xiong et al., "A Novel Indoor Localization Scheme", IEEE 12th International Conference on Communication Technology, Nov. 11-14, 2010, pp. 338-341.

* cited by examiner

200 ➡

Receive UWB RS configuration information ⤳ 201

↓

Transmit/receive, to/from RAN node, UWB RS based on UWB RS configuration information ⤳ 202

10, 110, 120

301

POSITIONING

RELATED APPLICATION

This application was originally filed as PCT Application No. PCT/US2021/048207, filed on Aug. 30, 2021, which is incorporated herein by reference in its entirety.

TECHNOLOGICAL FIELD

Examples of the present disclosure relate to positioning. Some examples, though without prejudice to the foregoing, relate to Ultra-Wide Bandwidth, UWB, based positioning in New Radio, NR.

BACKGROUND

A wireless network (e.g., a Next Generation Radio Access Network, NG-RAN) comprises a plurality of network nodes including: terminal nodes (e.g., User Equipment, UE), access nodes (e.g., gNodeBs, gNBs), wherein communication between the terminal nodes and access nodes is wireless.

The conventional framework for positioning in $5^{th}$ Generation, 5G, NR (i.e., to determine the position of a UE—either via an Uplink, UL, positioning procedure or a Downlink, DL, positioning procedure) involves the transmission of Orthogonal Frequency-Division Multiplexing, OFDM, based Reference Signals. Such OFDM-based RSs can be either OFDM-based Sounding Reference Signals, SRS, transmitted by the UE for UL positioning; or OFDM-based Position Reference Signals, PRS, transmitted by gNBs for DL positioning. Such OFDM-based RSs are received, detected and measured by the gNBs (for UL positioning) or UE (for DL positioning). A Location Management Function, LMF, receives the measurements from the gNBs or UE. Such measurement information is received by the LMF via an Access and mobility Management Function, AMF, over a backhaul interface (e.g., NLs interface). The LMF then uses such received measurement information to compute the position of the UE. A NR Positioning Protocol A, NRPPa, carries positioning information between the NG-RAN nodes and the LMF over a NG control plane interface (e.g., NG-C interface).

In some circumstances it may be desirable to provide an improved apparatus and method for positioning. In some circumstances it may be desirable to improve accuracy in determining a position of a terminal node. In some circumstances it may be desirable to reduce power consumption in determining a position of a terminal node.

The listing or discussion of any prior-published document or any background in this specification should not necessarily be taken as an acknowledgement that the document or background is part of the state of the art or is common general knowledge. One or more aspects/examples of the present disclosure may or may not address one or more of the background issues.

BRIEF SUMMARY

The scope of protection sought for various embodiments of the invention is set out by the claims.

According to various, but not necessarily all, examples of the disclosure there are provided examples as claimed in the appended claims. Any examples and features described in this specification that do not fall under the scope of the independent claims are to be interpreted as examples useful for understanding various embodiments of the invention.

According to at least some examples of the disclosure there is provided an apparatus comprising means for:

receiving Ultra-Wideband, UWB, Reference Signal, RS, configuration information, wherein the UWB RS configuration information comprises information for configuring a transmission or a reception of a UWB RS by the apparatus to or from at least one node of a Radio Access Network, RAN; and based at least in part on the received UWB RS configuration information, causing transmission or reception of the UWB RS to or from the at least one node of the RAN.

According to various, but not necessarily all, examples of the disclosure there is provided a method comprising:

receiving Ultra-Wideband, UWB, Reference Signal, RS, configuration information, wherein the UWB RS configuration information comprises information for configuring a transmission or a reception of a UWB RS to or from at least one node of a Radio Access Network, RAN; and based at least in part on the received UWB RS configuration information, causing transmission or reception of the UWB RS to or from the at least one node of the RAN.

According to various, but not necessarily all, examples of the disclosure there is provided computer program instructions for causing an apparatus to perform:

receiving Ultra-Wideband, UWB, Reference Signal, RS, configuration information, wherein the UWB RS configuration information comprises information for configuring a transmission or a reception of a UWB RS by the apparatus to or from at least one node of a Radio Access Network, RAN; and based at least in part on the received UWB RS configuration information, causing transmission or reception of the UWB RS to or from the at least one node of the RAN.

According to various, but not necessarily all, examples of the disclosure there is provided an apparatus comprising:

at least one processor; and at least one memory including computer program instructions;

the at least one memory and the computer program instructions configured to, with the at least one processor, cause the apparatus at least to perform:

receiving Ultra-Wideband, UWB, Reference Signal, RS, configuration information, wherein the UWB RS configuration information comprises information for configuring a transmission or a reception of a UWB RS by the apparatus to or from at least one node of a Radio Access Network, RAN; and based at least in part on the received UWB RS configuration information, causing transmission or reception of the UWB RS to or from the at least one node of the RAN.

According to various, but not necessarily all, examples of the disclosure there is provided a non-transitory computer readable medium encoded with instructions that, when performed by at least one processor, causes at least the following to be perform:

receiving Ultra-Wideband, UWB, Reference Signal, RS, configuration information, wherein the UWB RS configuration information comprises information for configuring a transmission or a reception of a UWB RS to or from at least one node of a Radio Access Network, RAN; and based at least in part on the received UWB RS configuration information, causing transmission or reception of the UWB RS to or from the at least one node of the RAN.

According to at least some examples of the disclosure there is provided a Location Server, LS, comprising means for:

causing transmission, to an apparatus, of Ultra-Wideband, UWB, Reference Signal, RS, configuration information, wherein the UWB RS configuration information comprises information for configuring a transmission or a reception of a UWB RS by the apparatus to or from at least one node of a Radio Access Network, RAN.

According to various, but not necessarily all, examples of the disclosure there is provided a method comprising:

causing transmission, to an apparatus, of Ultra-Wideband, UWB, Reference Signal, RS, configuration information, wherein the UWB RS configuration information comprises information for configuring a transmission or a reception of a UWB RS by the apparatus to or from at least one node of a Radio Access Network, RAN.

According to various, but not necessarily all, examples of the disclosure there is provided computer program instructions for causing an apparatus to perform:

causing transmission, to an apparatus, of Ultra-Wideband, UWB, Reference Signal, RS, configuration information, wherein the UWB RS configuration information comprises information for configuring a transmission or a reception of a UWB RS by the apparatus to or from at least one node of a Radio Access Network, RAN.

According to various, but not necessarily all, examples of the disclosure there is provided an apparatus comprising:

at least one processor; and at least one memory including computer program instructions;

the at least one memory and the computer program instructions configured to, with the at least one processor, cause the apparatus at least to perform:

causing transmission, to an apparatus, of Ultra-Wideband, UWB, Reference Signal, RS, configuration information, wherein the UWB RS configuration information comprises information for configuring a transmission or a reception of a UWB RS by the apparatus to or from at least one node of a Radio Access Network, RAN.

According to various, but not necessarily all, examples of the disclosure there is provided a non-transitory computer readable medium encoded with instructions that, when performed by at least one processor, causes at least the following to be perform:

causing transmission, to an apparatus, of Ultra-Wideband, UWB, Reference Signal, RS, configuration information, wherein the UWB RS configuration information comprises information for configuring a transmission or a reception of a UWB RS by the apparatus to or from at least one node of a Radio Access Network, RAN.

The following portion of this 'Brief Summary' section describes various features that can be features of any of the examples described in the foregoing portion of the 'Brief Summary' section. The description of a function should additionally be considered to also disclose any means suitable for performing that function.

In some but not necessarily all examples, the UWB RS is at least one selected from the group of:

an uplink, UL, UWB RS, and a downlink, DL, UWB RS; and wherein the UWB RS is configured for use in determining a position of a User Equipment of the RAN.

In some but not necessarily all examples, the UWB RS configuration information comprises an indication of at least one selected from the group of:

information for enabling the apparatus to determine a structure of the UWB RS;

a pulse width of the UWB RS;

a pulse type of the UWB RS;

timing information of the UWB RS;

a transmission power of the UWB RS;

a bandwidth of the UWB RS;

a periodicity of the UWB RS; and a centre frequency of the UWB RS.

In some but not necessarily all examples, the UWB RS configuration information is received from at least one selected from the group of:

a Location Server, LS;

a node of the RAN;

an access node; and a core node.

In some but not necessarily all examples, the apparatus further comprises means for:

causing transmission of UWB capability information, wherein the UWB capability information comprises information indicative of capability of the apparatus for transmitting, and/or receiving, UWB RSs.

In some but not necessarily all examples, causing transmission of the UWB capability information is based at least in part on a request for the UWB capability information.

In some but not necessarily all examples, the apparatus receives the UWB RS configuration information based at least in part on the UWB capability information.

In some but not necessarily all examples, the apparatus further comprises means for:

receiving configuration information for configuring a time period within which the apparatus is to transmit the UWB RS to the at least one node of the RAN.

In some but not necessarily all examples, the apparatus further comprises means for:

receiving UWB RS triggering information, wherein the UWB RS triggering information comprises information for triggering the transmission of the UWB RS to the at least one node of the RAN; and wherein the UWB RS is transmitted based at least in part on the received UWB RS triggering information.

In some but not necessarily all examples, the UWB RS configuration information is received prior to the apparatus entering into a Radio Resource Control, RRC, idle state or an RRC inactive state.

In some but not necessarily all examples, the UWB RS triggering information is received whilst the apparatus is in at least one selected from the group of:

the RRC idle state, another instance of an RRC idle state, the RRC inactive state, and another instance of an RRC inactive state.

In some but not necessarily all examples, the UWB RS is transmitted whilst the apparatus is in at least one selected from the group of:

the RRC idle state, another instance of an RRC idle state, the RRC inactive state, and another instance of an RRC inactive state.

In some but not necessarily all examples, the apparatus further comprises means for:

decoding the UWB RS; and/or measuring the UWB RS.

In some but not necessarily all examples, the apparatus further comprises means for:

receiving UWB measurement information, wherein the UWB measurement information comprises information indicative of one or more measurements to be performed on the received UWB RS.

In some but not necessarily all examples, the apparatus further comprises means for:

performing at least one measurement of the UWB RS based at least in part on the UWB measurement information.

In some but not necessarily all examples, the apparatus further comprises means for:

reporting a measurement result of a measurement performed on the received UWB RS.

In some but not necessarily all examples, the apparatus selected from the group of:

a node of the RAN;

a User Equipment, UE;

an access node of the RAN; and a Transmission and Reception Point, TRP.

While the above examples of the disclosure and optional features are described separately, it is to be understood that their provision in all possible combinations and permutations is contained within the disclosure. Also, it is to be understood that various examples of the disclosure can comprise any or all of the features described in respect of other examples of the disclosure, and vice versa.

BRIEF DESCRIPTION OF THE DRAWINGS

Some examples will now be described with reference to the accompanying drawings in which.

Figures 1, 2:
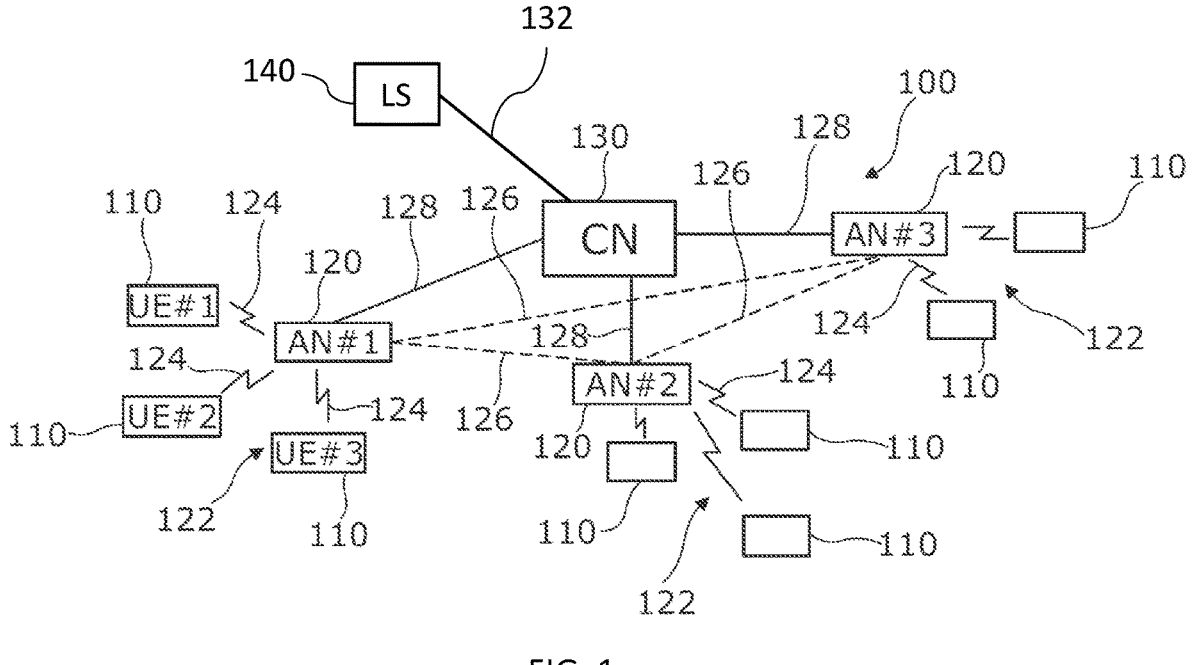
FIG. 1 shows an example of the subject matter described herein.
FIG. 2 shows another example of the subject matter described herein.

The figures are not necessarily to scale. Certain features and views of the figures can be shown schematically or exaggerated in scale in the interest of clarity and conciseness. For example, the dimensions of some elements in the figures can be exaggerated relative to other elements to aid explication. Similar reference numerals are used in the figures to designate similar features. For clarity, all reference numerals are not necessarily displayed in all figures.

In the drawings (and description) a similar feature may be referenced by the same three-digit number. In the drawings (and description), an optional subscript to the three-digit number can be used to differentiate different instances of similar features. Therefore, a three-digit number without a subscript can be used as a generic reference and the three-digit number with a subscript can be used as a specific reference. A subscript can comprise a single digit that labels different instances. A subscript can comprise two digits including a first digit that labels a group of instances and a second digit that labels different instances in the group.

ABBREVIATIONS/DEFINITIONS

3GPP Third Generation Partnership Project

5G $5^{th}$ Generation

AOA Angle of Arrival (receiver side)

AOD Angle of Departure (transmitter side)

gNB gNodeB

IE Information element

ISD Intersite distance

LMF Location Management Function

LPP LTE Positioning Protocol

LTE Long-Term Evolution

MAC CE Medium Access Control Control Element

NG Next Generation

NR New Radio

NRPPa New Radio Positioning Protocol Annex

OFDM Orthogonal Frequency-Division Multiplexing

PRS Positioning Reference Signal

RAN Radio Access Network

RAT Radio Access Technology

RRC Radio Resource Control

SRS Sounding Reference Signal

TDOA Time Difference Of Arrival

TRP Transmission Point

TW-TOA Two Way Time Of Arrival

UE User Equipment

UWB Ultra-WideBand

DETAILED DESCRIPTION

FIG. 1 schematically illustrates an example of a network 100 comprising a plurality of network nodes including terminal nodes 110 (also referred to as User Equipment, UE), access nodes 120, one or more core nodes 130 and one or more location servers 140. The terminal nodes 110 and access nodes 120 communicate with each other. The access nodes 120 and one or more location servers 140 may communicate directly each other. The access nodes 120 may communicate with the location server 140 via the one or more core nodes 130. The one or more core nodes 130 may, in some but not necessarily all examples, communicate with each other. The one or more access nodes 120 may, in some but not necessarily all examples, communicate with each other.

The network 100 is in this example a radio telecommunications network, i.e., a Radio Access Network, RAN, in which at least some of the terminal nodes 110 and access nodes 120 communicate with each other using transmission/reception of radio waves.

The RAN 100 may be a cellular network comprising a plurality of cells 122 each served by an access node 120. The access nodes 120 comprise cellular radio transceivers. The terminal nodes 110 comprise cellular radio transceivers.

In the particular example illustrated, the network 100 is a Next Generation (NG) or New Radio (NR) network. NR is the Third Generation Partnership Project (3GPP) name for 5G technology.

The interfaces between the terminal nodes 110 and the access nodes 120 are radio interfaces 124 (e.g., Uu interfaces). The interfaces between the access nodes 120 and one or more core nodes 130 are backhaul interfaces 128 (e.g., S1 and/or NG interfaces). The interfaces between the one or more location servers 140 and the one or more core nodes 130 are backhaul interface 132 (e.g., NLs interface).

Depending on the exact deployment scenario, the access nodes 120 can be RAN nodes such as NG-RAN nodes. NG-RAN nodes may be gNodeBs (gNBs) that provide NR user plane and control plane protocol terminations towards the UE. NG-RAN nodes may be New Generation Evolved Universal Terrestrial Radio Access network (E-UTRAN) NodeBs (ng-eNBs) that provide E-UTRA user plane and control plane protocol terminations towards the UE. The gNBs and ng-eNBs may be interconnected with each other by means of Xn interfaces. The gNBs and ng-eNBs are also connected by means of NG interfaces to the 5G Core (5GC), more specifically to the AMF (Access and Mobility management Function) by means of the NG-C interface and to the UPF (User Plane Function) by means of the NG-U interface. The access nodes 120 may be interconnected with each other by means of Xn interfaces 126. The cellular network 100 could be configured to operate in licensed or unlicensed frequency bands, not least such as a 60 GHz unlicensed band where beamforming may be required in order to achieve required coverage.

The access nodes 120 can be deployed in a NR standalone operation/scenario. The access nodes 120 can be deployed in a NR non-standalone operation/scenario. The access nodes can be deployed in a Carrier Aggregation operation/scenario. The access nodes 120 can be deployed in a dual connectivity operation/scenario, i.e., Multi Radio Access Technology-Dual Connection (MR-DC), not least for example such as:

- Evolved Universal Terrestrial Radio Access-New Radio Dual Connectivity (EUTRA-NR-DC, also referred to as EN-DC),
- New Radio-Evolved Universal Terrestrial Radio Access Dual Connectivity (NR-EUTRA-DC, also referred to as NE-DC),
- Next Generation Radio Access Network Evolved Universal Terrestrial Radio Access-New Radio Dual Connectivity (NG-RAN E-UTRA-NR Dual Connectivity, also referred to as NGEN-DC), or
- New Radio Dual Connectivity (also referred to as NR-DC).

In such non-standalone/dual connectivity deployments, the access nodes 120 may be interconnected to each other by means of X2 or Xn interfaces, and connected to an Evolved Packet Core (EPC) by means of an S1 interface or to the 5GC by means of a NG interface.

The terminal nodes 110 are network elements in the network that terminate the user side of the radio link. They are devices allowing access to network services. The terminal nodes 110 may be referred to as User Equipment (UE), mobile terminals or mobile stations. The term 'User Equipment' may be used to designate mobile equipment comprising a smart card for authentication/encryption etc such as a Subscriber Identity Module (SIM). In other examples, the term 'User Equipment' is used to designate a location/position tag, a hyper/smart tag or a mobile equipment comprising circuitry embedded as part of the user equipment for authentication/encryption such as software SIM.

The access nodes 120 are network elements in the network responsible for radio transmission and reception in one or more cells 122 to or from the terminal nodes 110. Such access nodes may also be referred to as a transmission reception points (TRP's) or base stations. The access nodes 120 are the network termination of a radio link. An access node 120 can be implemented as a single network equipment, or have a split architecture that is disaggregated/distributed over two or more RAN nodes, such as a central unit (CU), a distributed unit (DU), a remote radio head-end (RRH), using different functional-split architectures and different interfaces.

Where the access node 120 has a disaggregated (split) architecture, access node 120 can comprises one or more distributed units (gNB-DU) and a centralized unit (gNB-CU), not shown in FIG. 1. The gNB-CU is a logical node configured to host a Radio Resource Connection (RRC) layer and other layers of the access node 120. The gNB-CU controls the operation of one or more gNB-DUs. The gNB-DU is a logical node configured to host Radio Link Control (RLC) protocol layer, Medium Access Control (MAC) layer and Physical (PHY) layer of the access node 120. The gNB-DU communicates via a dedicated interface (F1) to the RRC layer hosted by the gNB-CU. One gNB-DU can support one or multiple cells 122, whereas one cell is supported by only one gNB-DU 220.

The location server 140 is a device that manages the support of different location services for UEs, including positioning of UEs and delivery of assistance data to UEs. The location server can be connected to the core node and the Internet. The location server can be implemented as one or more servers. The location server is configured to support one or more location services for UEs 110 that can connect to the location server 140 via the core network 130 and/or via the Internet. The location server may be referred to as Location Management Function (LMF). Where the location server resides in a RAN node, it may be referred to as a Location Management Component (LMC). The location server may interact with a serving RAN node for a UE in order to obtain position measurements for the UE, including uplink measurements made by a RAN node and downlink measurements made by the UE.

In the following description, a location server 140 will be referred to as an LMF 140, an access node 120 will be referred to as a gNB 120 and a terminal node 110 will be referred to as a UE 110.

The position of a UE within a RAN can be determined by an LMF by various network-based positioning techniques (such as using LTE Positioning Protocol, LPP, or New Radio Positioning Protocol, NRPP). Conventional techniques involve the exchange, over a Uu interface, of OFDM-based RSs (namely transmitting OFDM-PRSs from RAN nodes to a UE for DL positioning; and transmitting OFDM-SRSs from a UE to RAN nodes for UL positioning). Such Radio Access Technology, RAT, based positioning techniques may utilise one of the following methods: Uplink Angle of Arrival (UL-AoA), Downlink Angle of Departure (DL-AoD), Variance of Time of Arrival (TOA)-based ranging, Uplink Time Difference of Arrival (UL-TDOA), Downlink Time Difference of Arrival (DL-TDOA), and Multi-cell Round Trip Time (Multi-RTT).

For conventional positioning, e.g., variance of time-of-arrival (TOA)-based ranging in a multipath-free channel, higher signal to noise ratio (SNR) and wider bandwidth may result in more accurate ranging. However, an issue with conventional RAT-dependent positioning (e.g., 5G NR cellular based positioning) is the ability to provide accurate positioning since the achievable accuracy may be limited to the available bandwidth of the OFDM-based PRSs and SRSs, e.g., as used in conventional 5G NR RAT-based positioning.

A further issue with conventional positioning is the ability to provide low UE power consumption positioning, especially in Radio Resource Control, RRC idle and RRC inactive mode (where no components related to 5G NR communication in a UE use the battery in these states). In conventional positioning, it may be necessary to switch out of RRC idle and inactive states and enter into an RRC active state (i.e., RRC connected state) and then trigger a conventional positioning method (e.g., as specified in Rel. 15 and Rel. 16).

It is desirable to provide accurate (e.g., cm level) positioning, especially in indoor scenarios, or outdoor scenarios with low Inter Site Distances, ISDs. It is desirable to provide positioning with low power consumption. Moreover, it is desirable to provide such positioning whilst a UE is in any state (e.g., RRC idle, RRC inactive or RRC active).

Ultra-wideband, UWB, is a technology for transmitting information across a wide bandwidth (e.g., >500 MHz). This may allow for the transmission of a large amount of signal energy without interfering with conventional narrowband and carrier wave transmission in the same frequency band. UWB can be defined as an antenna transmission for which emitted signal bandwidth exceeds 500 MHz. A difference between conventional radio transmissions (e.g., OFDM based transmissions) and UWB is that conventional systems can transmit information by varying a power level, frequency, and/or phase of a sinusoidal wave. UWB transmissions can transmit information by generating radio energy at one or more specific time intervals and can occupy a large bandwidth, thus enabling pulse-position or time modulation. Information can also be modulated on UWB signals (for example UWB Physical Layer signals, UWB PHY signals, comprising pulses/sequence of pulses) by encoding: a polarity of the pulse, its amplitude and/or by using orthogonal pulses. UWB pulses can be sent sporadically at relatively low pulse rates to support time or position modulation, but can also be sent at rates up to the inverse of the UWB pulse bandwidth. A UWB radio system can be used to determine the "time of flight" of a UWB transmission at various frequencies. This can help overcome multipath propagation since some of the frequencies may have a line-of-sight trajectory, while other indirect paths have longer delays. With a cooperative symmetric two-way metering technique, distances can be measured to high resolution and accuracy.

In recent years, Ultra-Wideband, UWB, (IEEE 802.15.4a)—i.e., transmitting a signal over multiple bands of frequencies such as from 3.1 to 10.6 GHz—has been considered as a technology that might be used for positioning, which might be able to deal with positioning issues in GPS-challenged scenarios, such as indoor scenarios. UWB transmissions can propagate through walls, clothing and different materials, and can coexist with other Radio Frequency, RF, signals without causing and suffering from interference due to the radio spectrum employed and the difference in signals. From a positioning perspective, in the time domain, UWB positioning can use ultra-short pulses (e.g., less than 1 ns), and can use absolute bandwidths of more than 500 MHz in the frequency domain. These short duration waveforms can enable high time resolution, where multipath signals can be identified and filtered, and accurate and reliable time-based ranging procedures (e.g., Two Way Time Of Arrival, TW-TOA, or Time Difference Of Arrival, TDOA), which contribute to improved positioning accuracy. Also, UWB systems can operate in the baseband, which makes it possible to use this technology in low-cost and low-power Wireless Sensor Networks, WSNs.

UWB ranging/positioning can be characterized by the transmission of extremely narrow pulses (e.g., with a duration of a few nanoseconds), resulting in quite a wide spectrum of greater than or equal to 500 MHz. This can make UWB signals relatively resistant to interferences and can allow very accurate time of flight measurements. The UWB spectrum can be spread among other systems (e.g., Wi-Fi 802.11a/n/ac/ax) with very low power (e.g., an energy per bit of 5 nJ/bit) to avoid disturbance and being disturbed.

The IEEE 802.15.4 standard defines two physical layers for UWB signals. One layer is for Low Pulse Repetition, LPR, frequencies of 1 MHz to 4 MHz—referred to as LRP UWB PHY. The other layer, mainly used in current applications, works with High Pulse Repetition, HPR, frequencies ranging from 4 MHz to 250 MHz—referred to as HRP UWB PHY. The majority of current applications use defined high band channels in the range of 6 GHz to 10 GHz with a channel bandwidth of 499.2 MHz. The IEEE 802.15.4 standard also defines modulation schemes for differing pulse rates that are to be used by: Ranging Devices, RDEVs, and Enhanced Ranging Devices, ERDEVs.

Based on the IEEE 802.15.4a standard, with UWB based positioning, one can determine a relative position of one device relative to another device in the line of sight, for example up to 200 meters away. For instance, the IEEE 802.15 standard defines a UWB Reference Signal, RS, namely a Direct Sequence (DS) UWB PHY. DS UWB is part of the IEEE 802.15.4a standard which can support precision ranging (<1 m) and provide robustness at low transmit powers.

Currently, there is no standard solution of including/integrating UWB based positioning in 5G NR systems.

Examples of the present disclosure seek to provide a novel solution to integrate UWB positioning/sensing into a RAN positioning framework (e.g., integrating UWB positioning/sensing into a 5G NR positioning framework). Examples seek to provide such joint UWB and 5G positioning for enabling a high accuracy and low power positioning solution (enabling UE RRC idle mode positioning and UE RRC inactive mode positioning). Examples seek to provide positioning not least: for indoor use, for low ISDs, or for any scenario where a limited range is acceptable-including side-link positioning).

In various examples of the disclosure, UWB transmitters, UWB receivers and/or UWB transceivers are provided/integrated in UEs and also on the network side, i.e., integrating UWB transceivers in gNBs (not least such as indoor micro/pico cell gNBs). Such UWB enabled UEs and gNBS are collectively referred to herein as 'UWB nodes'.

As will be discussed in further detail below, in examples of the disclosure, a joint NR UWB positioning framework is provided that can enable: tight synchronization between gNBs, the ability to trigger (e.g., dynamically/upon request) a positioning process/session, and also calculation of an absolute position. In some examples, in essence, a 5G NR positioning framework (including control signals) is used with novel enhancements, while the transmission, reception and measurement of a UWB Reference Signal, RS (i.e., a Level-1 PHY signal) is used within the framework for accurate reference sequence transmit and reception for sensing.

FIG. 2 schematically illustrates a flow chart of a method 200 according to an example of the present disclosure.

The component blocks of FIG. 1 are functional and the functions described can be performed by a single physical entity (such as an apparatus 10 as described with reference to FIG. 9, which may be implemented as a UWB node either: in a UWB enabled UE 110 [namely a UE with UWB transceiver functionality for transmitting and receiving UWB signals, i.e., UWB PHY signals such as UWB Reference Signals, RSs]; or in a UWB enabled gNB 120 [i.e., gNB with UWB transceiver functionality], which are referred to collectively herein as 'UWB nodes'). The functions described can also be implemented by a computer program (such as is described with reference to FIG. 10).

In block 201, an Ultra-Wideband, UWB, Reference Signal, RS, configuration information (e.g., Msg. 2 of FIGS. 5, 6 and 8) is received by an apparatus. The UWB RS configuration information is transmitted from: a Location Server, LS, 140, at least one node 120, or a CN 130 of the Radio Access Network, RAN 100. The UWB RS configuration information comprises information for configuring a transmission, or a reception, of a UWB RS by the apparatus to or from at least one node of a Radio Access Network, RAN, 100. For instance, the UWB RS configuration information can provide information for enabling the apparatus to: generate and transmit the UWB RS, or receive and decode the UWB RS.

In examples of the disclosure where Downlink, DL, UWB positioning is supported within a 5G NR framework, the LS (e.g., a Location Management Function, LMF) may configure the UWB nodes, which are to receive the UWB RS, to detect and measure the UWB RS. Such detection and measurement are Physical Layer, PHY, operations to be performed for positioning purposes. For instance, a gNB receiving the UWB RS needs to know how to process the UWB RS and its sequence of pulses in order to extract relevant positioning measurements, not least such as TOA, to report to the LMF to enable the LMF to calculate the UE's position using the reported measurements. By contrast, in previous hybrid positioning techniques involving 5G NR positioning and non-RAT/RAT-independent positioning (e.g., GNSS/IMU positioning), these rely on passing Layer-2, L2, (and above) messages with payload containing an already computed position from the RAT-independent positioning (e.g., L2 and above) protocols for reporting already computed GNSS/IMU determined positions. Such previous hybrid positioning techniques are different from those of examples of the present disclosure which activate and perform a UWB positioning session in which the gNB receives Layer-1 PHY UWB RSs and performs measurement on the same that are reported to the LMF and used thereby to independently compute the UE's location.

In some examples, the UWB RS is configured for use in determining a position of a User Equipment, UE, 110 in a RAN 100. For instance, the parameters of the UWB RS, e.g., its pulse sequence, pulse width, pulse types, and timing information are configured for use in providing a positioning procedure.

As will be described in further detail below with respect to the signalling diagrams of FIGS. 5-8; in some examples: the UWB RS can be used for UL positioning, the apparatus is a UE 110, and the UWB RS configuration information is received by the UE from an LS 140 of a RAN 100 (via a serving gNB). In such a scenario, the received UWB RS configuration information comprises information for configuring the UE to transmit a UWB RS to one or more gNBs 120 (and also possibly to other UEs). In such a scenario, the UWB RS can be a UWB UL positioning RS or sensing RS.

As will be described in further detail below with respect to the signalling diagrams of FIGS. 5-8; in some examples: the UWB RS can be used for UL positioning, the apparatus is a gNB 120, and the UWB RS configuration information is received by the gNB from an LS 140 of a RAN 100. In such a scenario, the received UWB RS configuration information comprises information for configuring the gNB to receive a UWB RS from a UE 110. In such a scenario, the UWB RS can be an UL UWB RS.

In some examples, the UWB RS can be used for DL positioning, the apparatus is a gNB 120, and the UWB RS configuration information is received by the gNB from an LS 140 of a RAN 100. In such a scenario, received UWB RS configuration information comprises information for configuring the gNB to transmit a UWB RS to a UE 110. In such a scenario, the UWB RS can be a UWB DL positioning RS or sensing RS.

Figure 8:
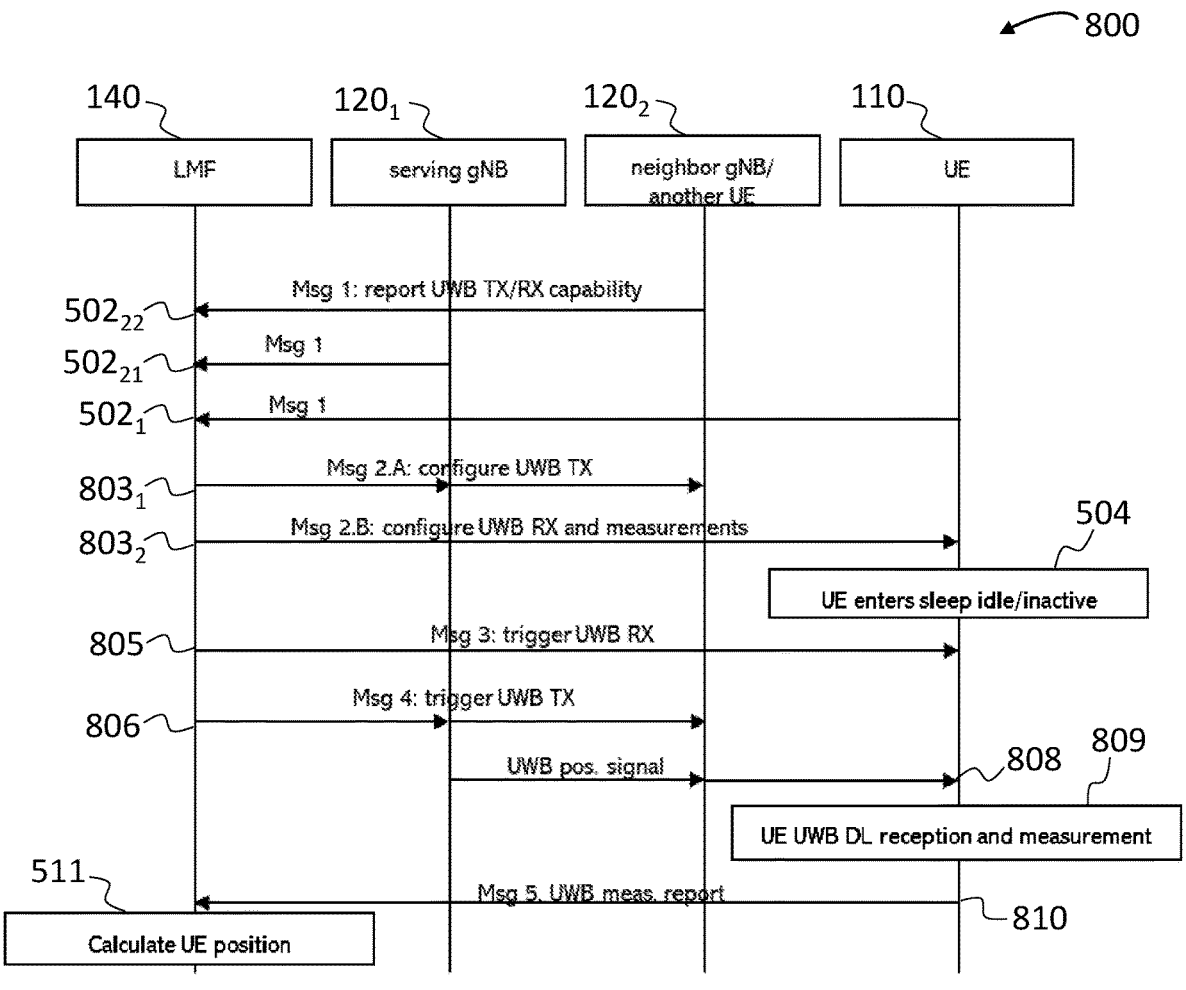
FIG. 8 shows another example of the subject matter described herein.

In some examples (e.g., as shown in FIG. 8): the UWB RS can be used for DL positioning, the apparatus is a UE 110, and the UWB RS configuration information is received by the UE from an LS 140 of a RAN 100 (via a serving gNB). In such a scenario, the received UWB RS configuration information comprises information for configuring the UE to receive a UWB RS from one or more gNBs 120. In such a scenario, the UWB RS can be a DL UWB RS.

In some examples, the UWB RS configuration information comprises an indication UWB parameters such as at least one selected from the group of:

information for enabling the apparatus to determine a structure (i.e., time-frequency structure) of the UWB RS (e.g., to enable the apparatus to generate and transmit a UBW RS having the particular structure/particular pulse sequence, or to enable the apparatus to receive and decode a UBW having the particular structure/particular pulse sequence);

a pulse width of the UWB RS (not least for example pulse widths of the order of picoseconds or nanoseconds, for instance ranging from 100 ps-10 ns);

a pulse type of the UWB RS (not least for example: a Gaussian pulse, a Monocycle pulse, or a Gaussian doublet);

timing information of the UWB RS (e.g., a transmission time offset, such a transmission time offset may be offset with respect to a start of a frame and may be expressed as a number of OFDM symbols);

a transmission power of the UWB RS;

a bandwidth of the UWB RS;

a periodicity of the UWB RS; and a centre frequency of the UWB RS.

In block 202, the apparatus causes a transmission, via a UWB transmitter/transceiver, of the UWB RS to the at least one node of the RAN (or the apparatus receives, via a UWB receiver/transceiver, the UWB RS from the at least one node of the RAN) based at least in part on the received UWB RS configuration information.

In certain examples, the UWB RS is configured for determining a position of a UE in the RAN, and the apparatus that performs method 100 is the UE that is the subject of the positioning procedure. In such a scenario, following the UE's transmission of the UWB RS to the at least one node of the RAN, the at least one node of the RAN can perform one or more measurements on the UWB RS and can report its measurement results to the LS, thereby enabling the LS to determine the position of the UE.

In some examples, the apparatus is further configured to cause the transmission of UWB capability information (e.g., Msg. 1 of FIGS. 5, 6 and 7) to the LS (e.g., via a serving gNB when the apparatus is a UE), wherein the UWB capability information comprises information indicative of the apparatus's capability for transmitting, and/or receiving, UWB RSs.

Figure 5:
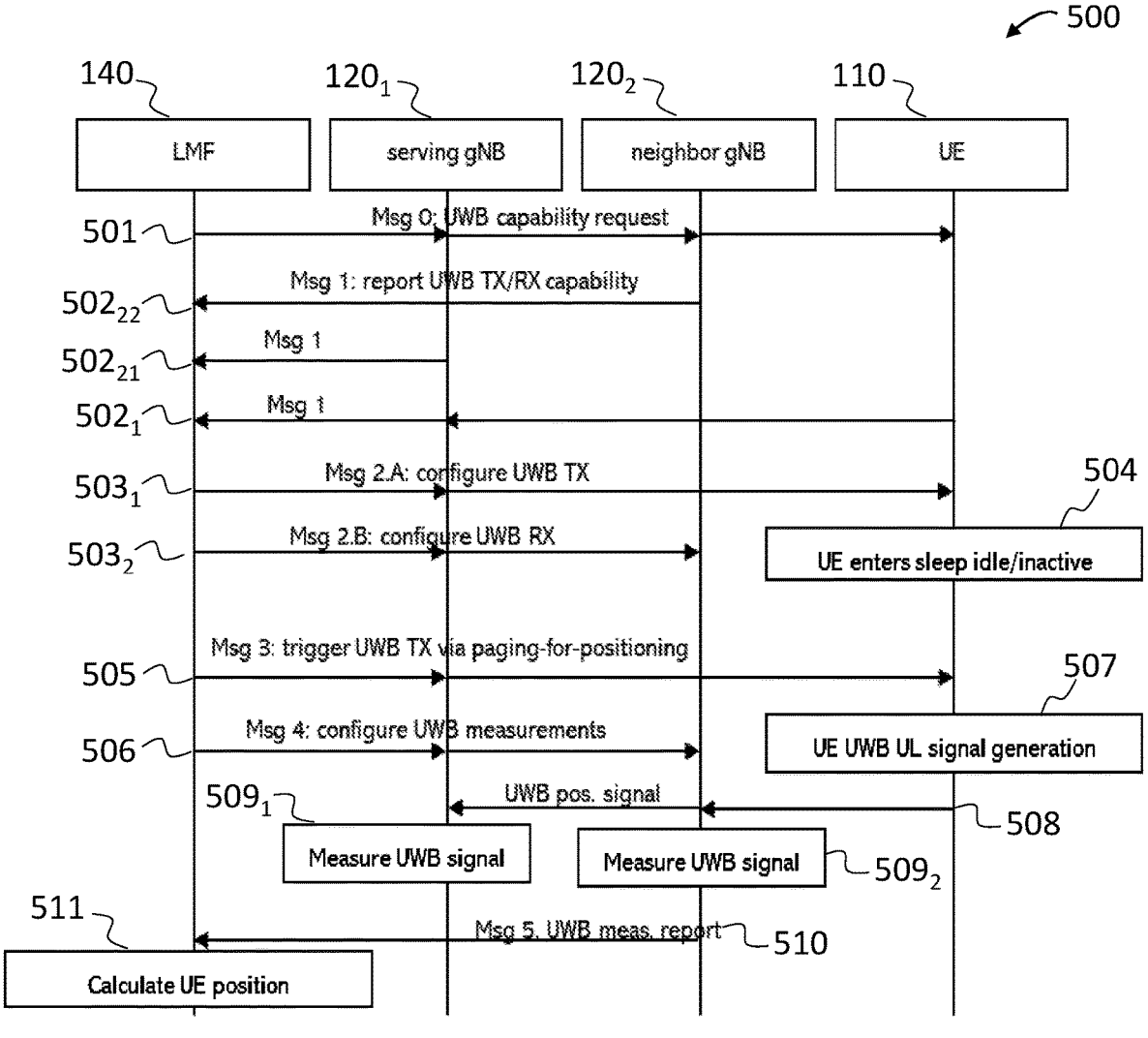
FIG. 5 shows another example of the subject matter described herein.
Figure 6:
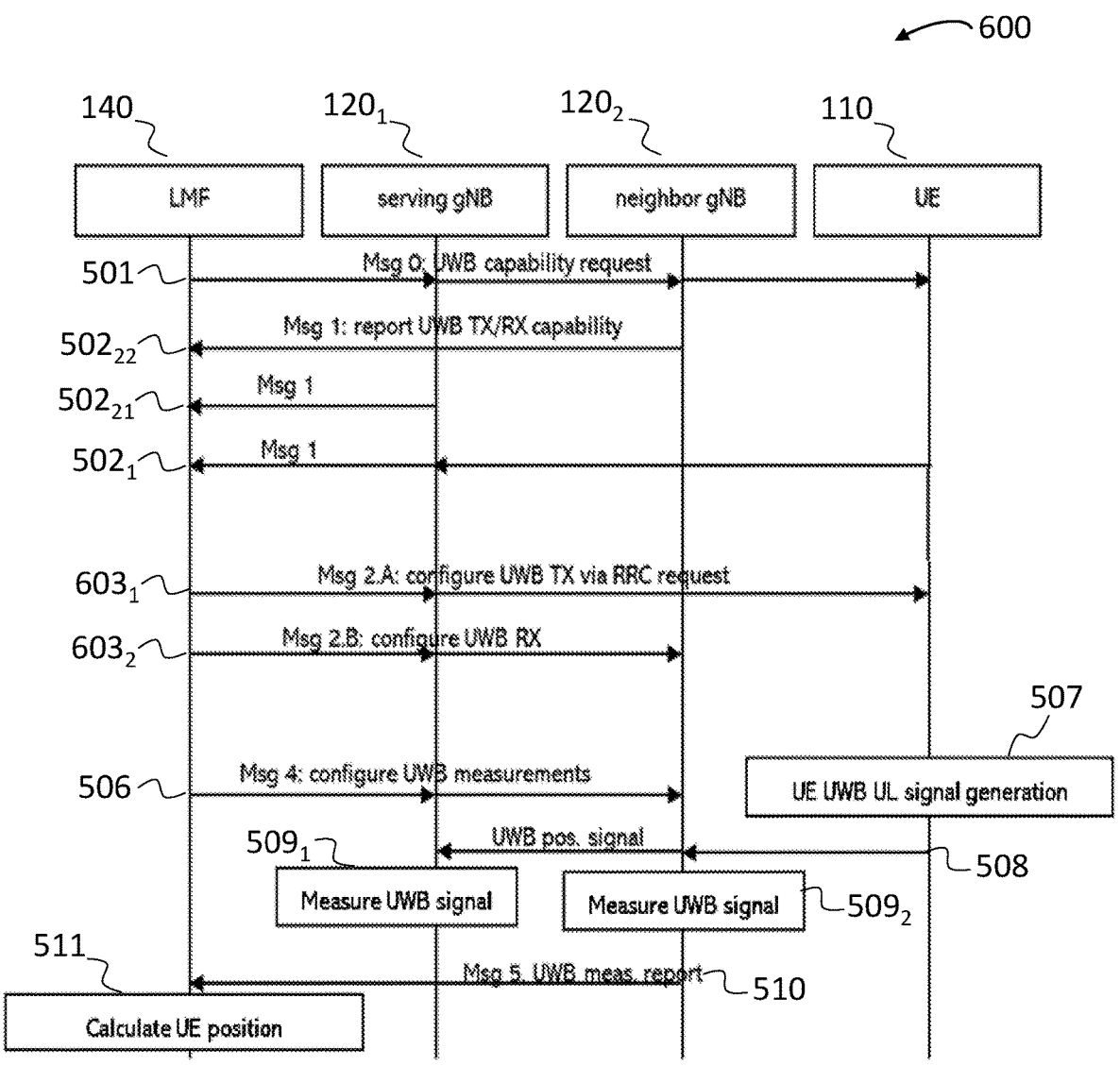
FIG. 6 shows another example of the subject matter described herein.

In some examples, causing transmission of the UWB capability information is based at least in part on a received request for the UWB capability information (e.g., Msg. 0 of FIGS. 5 and 6).

In some examples, the UWB RS configuration information, which is received from the LS in block 201, is based at least in part on the transmitted UWB capability information. In other words, the LS's generation of the UWB RS configuration information for transmission to the apparatus (e.g., via a serving gNB where the apparatus is a UE) is based on the UWB RS configuration information received by the LS.

In some examples, the apparatus further comprising means for receiving UWB RS triggering information (e.g., Msg. 3 of FIGS. 5 and 7), wherein the UWB RS triggering information comprises information for triggering the transmission of the UWB RS to the at least one node of the RAN. In some examples, the apparatus causes transmission, to the at least one node of the RAN, of the UWB RS based at least in part on the received UWB RS triggering information.

As will be discussed further below with respect to FIG. 5 for UL UWB positioning (and FIG. 8 for DL UWB positioning), in some examples, such as where the apparatus is a UE, the apparatus is configured such that it is pre-configured for a UWB positioning session prior to going to sleep/entering into a Radio Resource Control, RRC, idle state or an RRC inactive state; and moreover the apparatus is further configured so that it can receive the UWB RS triggering information whilst the apparatus is in an RRC idle or inactive state. Also, the apparatus is configured such that the UWB RS is transmitted (i.e., by a UWB transceiver of the apparatus) whilst the apparatus is in an RRC idle or inactive state, thereby enabling UWB (high accuracy) position whilst the UE is in a (low power/sleep) RRC idle or inactive state.

In some examples, such as where the apparatus is a gNB (or a UE) which receives the UWB RS of block 202, the apparatus further comprising means for: decoding the UWB RS; and/or measuring the UWB RS. Such decoding and/or measuring of the UWB RS can be based, at least in part on the received UWB RS configuration information of block 201.

In some examples, the apparatus further comprises means for receiving UWB measurement information (e.g., Msg. 4 of FIGS. 5 and 6), wherein the UWB measurement information comprises information indicative of one or more measurements to be performed on the received UWB RS. The apparatus may perform measuring of the UWB RS based, at least in part on the received UWB measurement information.

In some examples, the apparatus further comprises means for reporting, to the LS, a measurement result (e.g., Msg. 5 of FIGS. 5, 6 and 7) of one or more measurements performed on the UWB RS, whereupon the LS can use the received measurement(s) to determine a position, e.g., of a UE that is the subject of the UWB based positioning procedure.

In some examples, the apparatus is one of the group of:
a node of the RAN;
a User Equipment, UE;

an access node of the RAN (e.g., gNB); and
a Transmission and Reception Point, TRP.

In some examples, a Location Server, LS, is provided, wherein the LS comprises means for: causing transmission to an apparatus (e.g., UE or gNB), of UWB RS configuration information, wherein the UWB RS configuration information comprises information for configuring a transmission or a reception of a UWB RS by the apparatus to or from at least one node of a Radio Access Network, RAN. The LS then receives, from the at least one node of the RAN, information indicative of at least one measurement of the UWB RS performed by the at least one node of the RAN. The LS can then determine a position based at least in part on the at least one measurement of the UWB RS.

As will be described in further detail below with respect to the signalling diagram of FIG. 7, in some examples the LS configures the apparatus to perform a first Radio Access Technology, RAT, based positioning procedure to determine a first position of a UE, i.e., a first provisional/coarse position of the UE. Then the LS selects/identifies, based at least in part on the first position, one or more nodes of the RAN to receive at least one selected from the group of:
UWB RS configuration information,
UWB RS triggering information, and
UWB RS measurement information.

Figure 3:
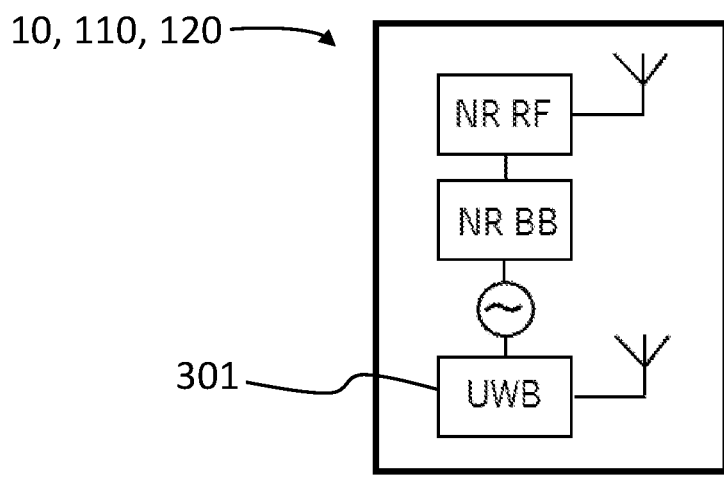
FIG. 3 shows another example of the subject matter described herein.

FIG. 3 schematically illustrates an example architecture of an apparatus 10 (which, in some examples, can be implemented in a UE 110; and in other examples can be implemented in a gNB 120). The apparatus comprises a UWB transceiver 301.

In some examples, the apparatus comprises each of a UWB modem and a NR modem which share a common reference clock that is locked to NR. This can ensure time synchronization for UWB transmissions/reception and NR transmissions/reception (i.e., via a Uu interface). Such time synchronization is not possible with UWB stand-alone architecture.

Figure 4:
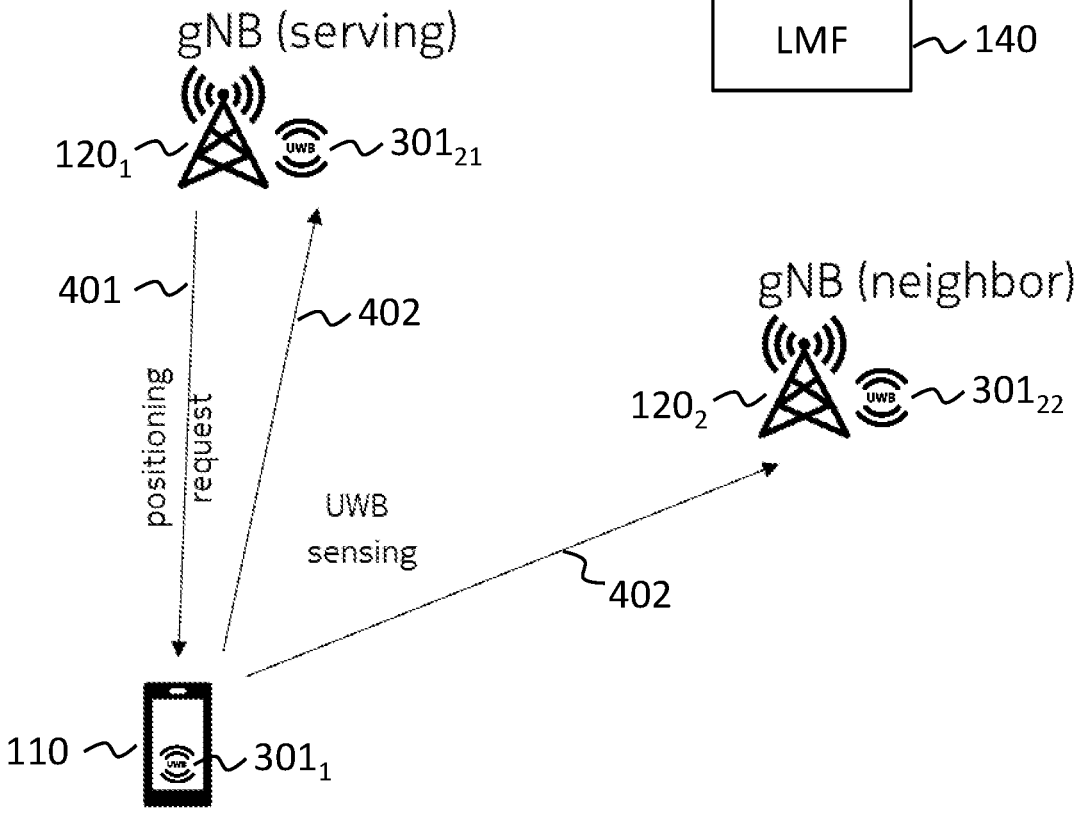
FIG. 4 shows another example of the subject matter described herein.

FIG. 4 schematically illustrates a high-level broad overview of NR positioning with UWB sensing in accordance with examples of the present disclosure. FIG. 4 shows the transmission and reception/measurement of UWB signals (i.e., UWB Physical Layer signals, UWB PHY signals such as UWB RSs) within an NR framework).

A serving gNB 120₁ sends a positioning request 401 to a UE 110. The sending of such a request may be directed by a LMF 140. Responsive to the request, the UE 110 transmits, via its UWB transceiver 301₁, a UWB RS 402. The UWB RS 402 is received by the serving gNB 120₁ and a neighbouring gNB 120₂ by their respective UWB transceivers 301₂₁ and 301₂₂. The gNBs 120₁ and 120₂ measure the received UWB RS and report their respective measurement results to the LMF. The LMF can then determine, from the received measurement reports (and based on the known [fixed] positions of the gNBs) a relative or absolute position of the UE.

The UE, and gNBs are duly configured by the LMF with parameters of the UWB RS for enabling the UE and gNBs to respectively transmit and receive the UWS RS. Details of such configuration and signalling for the same will now be described with respect to FIGS. 5-8.

FIG. 5 is a signalling diagram of signaling 500 between: an LMF 140, TRPs 120₁ and 120₂ (i.e., serving gNB 120₁ and neighbour gNB 120₂), and a UE 110 for implementing NR positioning of the UE using UWB sensing (i.e., transmission and reception/measurement of UWB signals such as UWB RSs, within an NR framework). In the example of FIG. 5, signalling is shown for providing UWB UL positioning for RRC idle and RRC inactive UE positioning.

At 501, Msg 0—a "UWB capability request" message—is sent by the LMF 140 to the TRPs and the UE in order to request the UWB signal generation and reception capabilities of the TRPs and UE. For example, the LMF may need to determine what UWB signal parameters, and values of the same, that the UWB source and UWB receivers are able to handle. For instance, the LMF may need to know what type of pulses the UWB source can generate (the UWB source being the UE for UL UWB positioning and TRP's [and other neighbouring UEs] for DL UWB positioning). Likewise, the LMF may need to know what the detection procedure (e.g., sampling rate) is at the UWB receiver. A new Information element, IE, for example "nr-UWB-RequestCapabilities", may define the contents of Msg 0. This IE may have explicit fields requesting: pulse type, pulse width, or a list of tuples {pulse type, width} that the UWB source may generate.

At 502, the UE and TRPs respectively reply to the "UWB capability request" message with a report to the LMF of their respective UWB capabilities via a respective Msg 1—a "UWB TX/RX capability" message. Where Msg 1 is sent from a TRP to the LMF (e.g., 502$_{21}$, and 502$_{22}$), Msg 1 can be an NRPPa message in which each TRPs reports to the LMF its UWB transceiver configuration. Where Msg 1 is sent from the UE to the LMF (e.g., 502$_1$), Msg 1 can be an RRC message, a Medium Access Control Control Element, MAC CE, or an LPP message in which the UE reports to LMF what type of UWB pulses it can support, e.g., pulse shape, pulse bandwidth, pulse duration, pulse frequencies, pulse repetition frequencies, and transmission power. A new IE, for example "nr-UWB-ProvideCapabilities", may define the contents of Msg 1. This IE can be an ordered list of parameter settings for UWB pulse generation with the first element of the list being a set of parameters to generate the first type of UWB signal, i.e., a first type of UWB RS.

At 503, the LMF configures the UE for UWB transmission and the TRPs for UWB reception, via a respective Msg 2. The Msg 2 may consist of the configuration of the UWB transmission (i.e., the configuration of the UWB signal, namely the UWB RS, that is used for the positioning). The LMF may select a particular/fixed configuration based on the capabilities and UWB configurations supported by the UE and TRPs as indicated in the received Msg 1s. For example, the LMF can select: a pulse width, a pulse type, periodicity and a time offset for the transmission of the UWB RS. Such a UWB signal configuration can be unique to the UE so that UE-to-UE interference may be avoided. The UWB configuration/UWB sequence could also be chosen so that enough TRPs are able to detect and measure the UWB RS. For example, the LMF may choose a type/configuration of UWB RS which is common to/compatible with the UWB transceiver capabilities of the TRPs and the UE, to ensure that the UWB RX and TX are matched. Msg 2.A carries the UWB signal configuration information to the UE. Msg 2.A can be sent directly to UE via an LPP message, or via serving gNB (as depicted in the figure), it can be carried by RRC messaging or MAC CE. Msg 2.B carries the UWB signal configuration information to the TRPs, e.g., via a NRPPa message. A new IE, for example "nr-UWB-ProvideAssistanceData", may define the contents of Msg 2. A and 2B.

At block 504, the UE, in RRC active/RRC connected mode/state, enters into a sleep state, e.g., an RRC idle state or RRC inactive state.

Subsequently, at 505 (when there is a demand for UE positioning), the LMF sends Msg 3—a page request—that triggers the UE's generation (at 507) of the UWB RS in accordance with the UWB TX configuration message of Msg 2A and the transmission of the UWB signal for positioning, i.e., the UWB RS, (at 508). The page request can comprise UWB signal details/ID. The paging-for-UWB message, Msg 3, can be configured in different resources than the traditional paging, e.g., be offset by X slots with respect to standard paging to avoid clashes/interference. The payload of the paging-for-UWB message, Msg 3, may contain an identifier of the UE that is being triggered for UWB TX for positioning. In some examples, the payload of the paging-for-UWB message, Msg 3, may contain one or more identifiers for one or more UEs that are simultaneously being triggered for UWB TX for positioning. A new IE, for example "nr-UWB-RequestLocationInformation", may define the contents of Msg 3.

At 506, the LMF sends Msg 4 to configure the TRPs to measure the UWB RS, i.e., the configured UWB RS that the LMF configured the UE to transmit at 5031. For example, the LMF send the Msg 4 which includes configuration information to the TRPs to enable the TRPs to determine what measurements to perform and report on the UWB RS. The measurements indicated in this message may be, for example: TDOA, AOA, received power, etc. A new IE, for example "nr-UWB-RequestLocationInformation", may define the contents of Msg 4. In some examples, 506 could occur before 505, i.e., Msg 4 could be sent before Msg 3.

At 507 and 508, the UE generates and transmits the UWB RS in accordance with the configuration information of Msg 2.A and Msg 3.

At 509$_1$ and 509$_2$, the UE's transmitted UWB RS is detected and measured by the TRPs.

At 510, the TRPs transmit their measurements to the LMF via Msg 5. A new IE, for example "nr-UWB-ProvideLocationInformation", may define the content of Msg. 5. This may be a list of measurements indexed by the UE's ID, containing e.g. {UWB TOA, AOA, RSRP}(UE_ID).

At 511, the LMF, having collecting the measurements of the UWB RS, computes/estimates the UE's location, e.g., its absolute location.

Whilst FIG. 5 shows UL positioning, it is to be appreciated that, mutatis mutandis (i.e., as illustrated and discussed with respect to FIG. 8 below), the procedure and signalling can be duly re-configured for DL positioning. For instance, the UE can be configured to receive and detect one or more UWB reference signals, transmitted by UWB nodes (e.g., UWB enabled serving gNB and its neighbouring gNBs as well as optionally other UWB enabled UEs) that have been duly configured to transmit a time synchronized UWB sensing reference signal.

FIG. 6 is a signalling diagram of signaling 600 between: an LMF 140, TRPs 120$_1$ and 120$_2$ (i.e., serving gNB 120$_1$ and neighbour gNB 120$_2$), and a UE 110 for implementing NR positioning of the UE using UWB sensing (i.e., transmission and reception/measurement of UWB RSs within an NR framework) similar to that of FIG. 5, but with a slightly different mechanism for triggering the UWB positioning and transmission of the UWB RS. Whereas the procedure and signaling of FIG. 5 can support UWB UL positioning for RRC idle and RRC inactive UE positioning, the procedure and signaling of FIG. 6 supports UWB UL positioning for RRC active UE positioning.

The messages of 501 and 502 of FIG. 6 correspond to the messages of 501 and 502 of FIG. 5. The messages 501 and 502$_1$ are respectively received and transmitted by the UE whilst the UE is in an RRC connected state.

At 603, the LMF configures the UE for UWB transmission and the TRPs for UWB reception, via a respective Msg 2. Msg 2 for the UE is received by the UE whilst the UE is in an RRC connected state. The Msg 2 may consist of the configuration of the UWB transmission (i.e., the configuration of the UWB signal, the UWB RS, that is used for the positioning). The LMF may select a particular/fixed configuration based on the capabilities and UWB configurations supported by the UE and TRPs as indicated in the received Msg 1s. For example, the LMF can select at least one of: a pulse width, a pulse type, periodicity and a time offset for the transmission of the UWB pulse. Such a UWB RS configuration can be unique to the UE so that UE-to-UE interference may be avoided. The UWB configuration/UWB sequence could also be chosen so that enough TRPs are able to detect and measure the UWB RS. For example, the LMF may choose a UWB RS which is common to/compatible with the TRPs and the UE, to ensure that the UWB RX and TX are matched. Msg 2.A carries the UWB signal configuration information to the UE. Msg 2.A can be sent directly to UE via LPP message, or via serving gNB (as depicted in the figure), it can be carried by RRC messaging or MAC CE. The Msg 2.A can act as an implicit or explicit trigger for the UWB positioning session and the UE's transmission of the UWB RS. The Msg 2.A may thereby serve as a positioning request/command which contains the UE UWB configurations (e.g., including: frequency, timing, periodicity, etc. of the UWB RS) as well as serving as a trigger for the transmission of the duly configured UWB RS. The Msg 2.B carries the UWB signal configuration information to the TRPs, e.g., via a NRPPa message.

The remaining procedures 506-511 of FIG. 6 correspond to those of FIG. 5.

To further enhance the positioning accuracy in UWB during RRC connected mode, adding a measurement gap may be needed if some of the hardware, HW, is being reused by a device implementation. In which case, the UE can be configured with a short window (e.g., 1 ms) in which to transmit the UWB RS during the gap. The measurement gap can be useful for sensitivity and 5G leakage. In some examples, the UE receives configuration information from its serving gNB for configuring a time window/time period within which the UE is to transmit the UWB RS. The UE's transmission of the UWB RS is based, at least in part in the configuration information i.e., such that the UWB RS is caused to be transmitted within the pre-determined time window. During this time window/time period, the UE may not be required to make other measurements, receive other signals, or transmit other signals.

Whilst FIG. 6 shows UL positioning, it is to be appreciated that, mutatis mutandis, the procedure and signalling can be duly re-configured for DL positioning, i.e., based on the UE being configured to detect one or more UWB reference signals and the UWB nodes (e.g., serving gNB and its neighbours as well as optionally other UEs) transmit a time synchronized UWB sensing reference signal.

Figure 7:
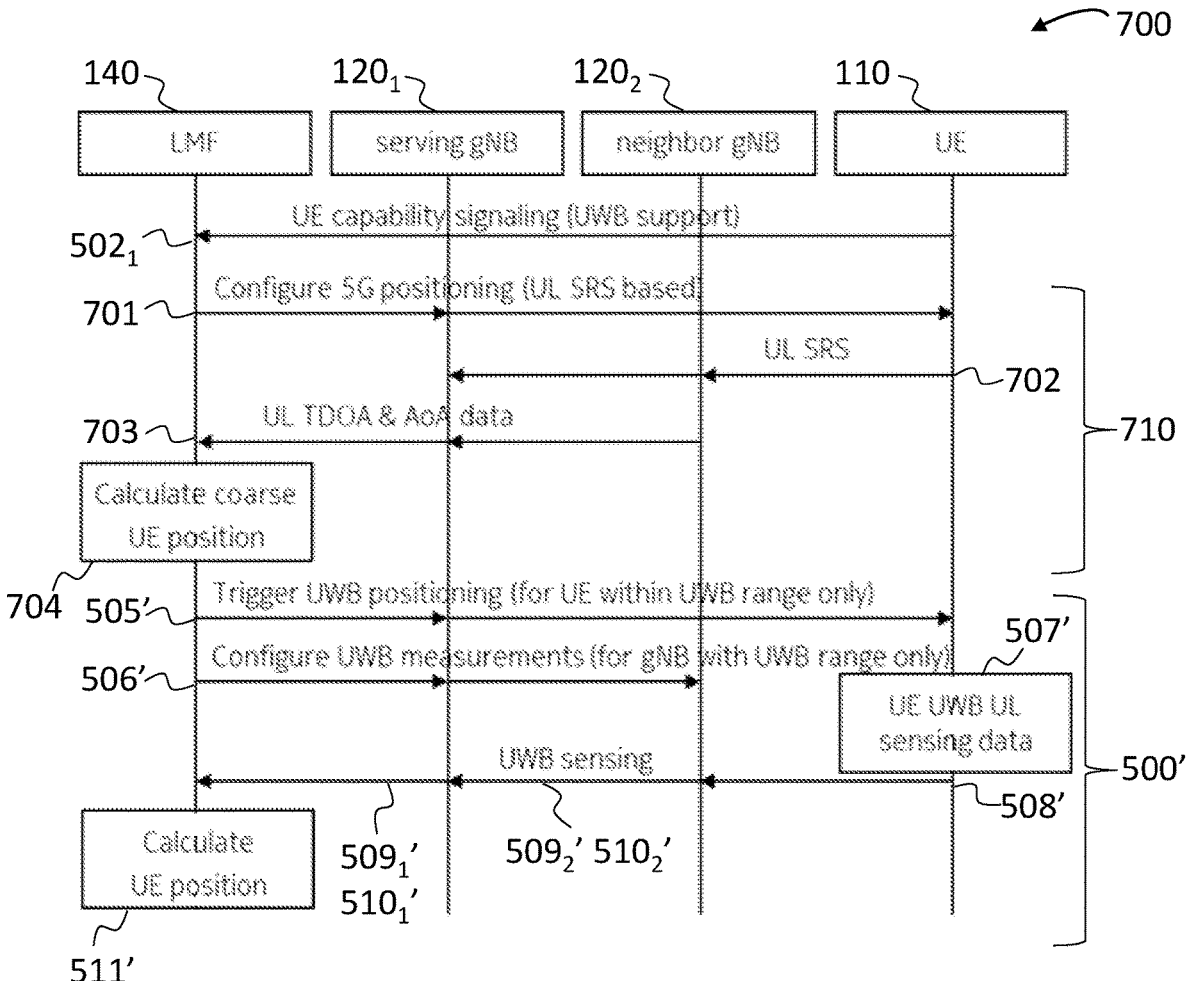
FIG. 7 shows another example of the subject matter described herein.

FIG. 7 is a signalling diagram of signaling 700 between: an LMF 140, TRP's 120₁ and 120₂ (i.e., serving gNB 120₁ and neighbour gNB 120₂), and a UE 110 for implementing NR positioning of the UE using UWB sensing (i.e., transmission and reception/measurement of UWB RSs within an NR framework) via a two-step position procedure. In essence, the LMF causes a conventional RAT-based (i.e., non-UWB signal based) positioning process/session 710 to be performed to estimate an initial/coarse position of the UE. Following the conventional RAT-based positioning process/session 710, a UWB-based positioning process/session 500' is performed wherein, based on the initial/coarse position of the UE, the LMF is able to select TRP's (and it may also select UE's), i.e., based not least on their proximity to the UE, and configuring them for receipt of a UWB RS to be subsequently transmitted. For instance, based on coarse UE location, the LMF can determine the location of UWB nodes (collocated with the gNB) within the linkbudget from the UE. Hence, only UWB nodes within range/"visibility" of the UE will be configured. The two-step procedure of FIG. 7 can apply to both UE when in an RRC connected state or in an RRC inactive/idle state.

At 502₁, on the UE transmits/signals its UWB capability to the LMF.

Responsive to this (i.e., on the basis that it is determined that the UE supports UWB based positioning), at 701, the LMF configures a conventional 5G NR positioning session 710 amongst the: UE, serving gNB and neighbour gNB(s). This comprises, at 701, configuring the UE to transmit a conventional UL SRS (i.e., non-UWB signal). Based at least in part on the received configuration, at 702, the UE transmits, to the serving gNB and/or the neighbour gNB, the duly configured (non-UWB) UL SRS for conventional 5G NR positioning procedure.

At 703, the serving and neighbour gNBs detect and measure the UL SRS and report measurement results (e.g., TDOA and AOA information) to the LMF.

At 704, the LMF calculates a coarse position/initial estimate position of the UE based on the collected measurement results in a conventional manner in accordance with current 5G specification for 5G NR positioning, e.g., using any 5G positioning method DL/UL Round Trip Time, RTT.

Based on the coarse position/initial estimate position of the UE, the LMF determines/selects which UWB nodes (i.e., gNBs and other UEs with UWB transceivers) are proximal/within a pre-determined distance of the UE. The LMF can then cause a UWB positioning session 500' to be carried out using just the UWB nodes that have been selected/determined based on their position relative to the coarse position/initial estimate position of the UE calculated in step 704, such that a more accurate/improved estimate position of the UE may be calculated in step 511' of the UWB positioning session 500'.

At 505' and 506', the LMF configures the UE and the UWB nodes (e.g., gNBs) within UWB sensing range of the UE for a UWB positioning session 500'. Such configuration may be similar to that of 505 and 506 in FIG. 5 (and may include: frequency, timing, periodicity, etc. of the UWB RS to be transmitted). The UWB positioning session 500' may broadly correspond to the procedure of FIGS. 5 and 6 with the messages and procedures of 505' to 511' of FIG. 7 broadly corresponding to the equivalent messages and procedures of 505 to 511 of FIGS. 5 and 6, except that only those gNBs determined to be sufficiently proximal to the UE are configured to receive, detect, measure and report the UWB RS.

In the 5G NR positioning session 710, 5G NR RSs (i.e., UL SRS 702, with a bandwidth <100 MHz) are used to calculate the coarse position of the UE in step 704. Based on the coarse position of the UE calculated via the 5G NR positioning session 710, UWB nodes proximal/within a pre-determined distance of the UE can be identified and a UWB-based positioning session 500' can be carried out using such UWB nodes. Moreover, UWB RSs are used in the UWB-based positioning session 500' that have a much higher bandwidth (>1 GHZ) than the 5G NR RSs used for the 5G NR positioning session 710. The wider bandwidth of the UWB RSs used in the UWB-based positioning session $500'$ (as compared to the RSs used in the 5G NR positioning session 710) enables a more accurate positioning estimate to be calculated in step 511' than is calculated in step 704 (due to the resolution of the respective RSs used). Hence, examples can make use of 5G NR positioning and enhance the coarse position therefrom by using the UWB-based positioning session $500'$ to gain additional positioning accuracy.

Whilst FIG. 7 shows UL positioning, it is to be appreciated that, mutatis mutandis, the procedure and signalling can be duly re-configured for DL positioning, i.e., based on the UE being configured to receive and detect one or more UWB reference signals and the transmitting UWB nodes (e.g., UWB enabled serving gNB and its neighbours as well as optionally other UWB enabled UEs) transmit a time synchronized UWB sensing reference signal.

Advantageously, the UWB position session can be configured only for those UWB nodes/stations (e.g., gNBs and other UEs) that are within UWB sensing range of the UE whose position is to be determined. Furthermore, such as joint/hybrid 5G and UWB positioning can enable cm level accuracy even for low cost 5G device e.g., Reduced Capability, REDCAP, NR devices.

FIG. 8 is a signalling diagram of signaling 800 between: an LMF 140, TRPs 120$_1$ and 120$_2$ (i.e., serving gNB 120$_1$ and neighbour gNB 120$_2$), and a UE 110 for implementing a framework for DL positioning of the UE in NR using UWB sensing. In the example of FIG. 8, signalling is shown for providing UWB DL positioning for RRC idle and RRC inactive UE positioning. Messages from the LMF to the UE are transferred via an LPP interface. Messages from the LMF to the TRPs are transferred via an NRPPa interface.

At 502$_{22}$, 502$_{21}$, 502$_1$, the TRPs and UE respectively report their respective UWB capabilities to the LMF via a respective Msg 1—a "UWB TX/RX capability" message. The TRP 502$_{21}$ may, in some examples, be another UE. The Msg 1 can be responsive to a Msg 0—a "UWB capability request" message-sent by the LMF 140 to the TRPs and the UE [not shown]. Where Msg 1 is sent from the TRPs to the LMF (e.g., 502$_{21}$, and 502$_{22}$), Msg 1 can be an NRPPa message in which each TRPs reports to the LMF its UWB transceiver configuration. Where Msg 1 is sent from the UE to the LMF (e.g., 502$_1$), Msg 1 can be an RRC message, a Medium Access Control Control Element, MAC CE, or an LPP message in which the UE reports to LMF what type of UWB pulses it can support, e.g., pulse shape, pulse bandwidth, pulse duration, pulse frequencies, pulse repetition frequencies, and transmission power. A new IE, for example "nr-UWB-ProvideCapabilities", may define the contents of Msg 1. This IE can be an ordered list of parameter settings for UWB pulse generation with the first element of the list being a set of parameters to generate the first type of UWB signal, i.e., a first type of UWB RS.

At 803, the LMF configures the UE for UWB reception and the TRPs for UWB transmission, via respective Msg 2s. The Msg 2 may consist of the configuration of the UWB RS to be transmitted for the UWB positioning session (i.e., the configuration of the UWB signal that is used for the positioning, i.e., the UWB RS). The LMF may select a particular/fixed configuration based on the capabilities and UWB configurations supported by the UE and TRPs determined based on the capabilities indicated in the received Msg 1s. Msg 2.A carries the UWB signal configuration information to the TRPs, e.g., via a NRPPa message, to enable the TRPs to transmit the configured UWB RS. A new IE, for example "nr-UWB-ProvideAssistanceData", may define the contents of Msg 2. A and 2.B. Msg 2.A carries the UWB signal configuration information to the UE to enable the UE to receive the configured UWB RS. Msg 2.B can be sent directly to UE via an LPP message, or via serving gNB, and it can be carried by RRC messaging or MAC CE.

At block 504, the UE, in RRC active/RRC connected mode/state, enters into a sleep state, e.g., an RRC idle state or RRC inactive state.

Subsequently, at 805 (when there is a demand for UE positioning), the LMF sends Msg 3—a page request—that triggers the UE's reception and measurement (at 809) of the UWB RS (which has been configured in accordance with the UWB TX configuration message of Msg 2.A). The page request can comprise UWB RS details/ID. The paging-for-UWB message, Msg 3, can be configured in different resources than the traditional paging, e.g., be offset by X slots with respect to standard paging to avoid clashes/interference. The payload of the paging-for-UWB message, Msg 3, may contain an identifier of the UE that is being triggered for UWB RX for positioning. In some examples, the payload of the paging-for-UWB message, Msg 3, may contain one or more identifiers for one or more UEs that are simultaneously being triggered for UWB RX for positioning. In some examples, Msg 3 may signal information to the UE to enable the UE to determine what measurements to perform and report on the UWB RS, such as for example: TDOA, AOA, received power, etc. A new IE, for example "nr-UWB-RequestLocationInformation", may define the contents of Msg 3.

At 806, the LMF sends Msg 4 to trigger the TRPs to generate and transmit (at 808) the UWB RS, i.e., the configured UWB RS that the LMF configured the TRPs to transmit at 803$_1$. A new IE, for example "nr-UWB-Trigger", may define the contents of Msg 4. In some examples, Msg 4 could be sent prior to Msg3.

At 808, the TRPs transmit the UWB RS in accordance with the configuration information of Msg 2.A and Msg 4.

At 809, the TRP's transmitted UWB RSs are detected and measured by the UE.

At 810, the UE transmits its measurements of the UWB RSs to the LMF via Msg 5. The Msg 5 may be transmitted directly to the LMF or transmitted via the serving gNB. A new IE, for example "nr-UWB-ProvideLocationInformation", may define the content of Msg. 5. This may be a list of measurements indexed by the UE's ID, containing e.g. {UWB TOA, AOA, RSRP}(UE_ID).

At 511, the LMF, having collecting the measurements of the UWB RS, computes/estimates the UE's location, e.g., its absolute location.

The blocks and signalling illustrated in FIGS. 2, 4-8 and discussed above can represent actions in a method, functionality performed by an apparatus, and/or sections of instructions/code in a computer program.

As has been described above, not least with respect to FIGS. 2-8, examples of the present disclosure effectively introduce a wide bandwidth PRS TX-RX (a UWB RS) into the 5G NR positioning framework. This is effected by allowing an LMF to configure the parameters of the transmission and reception of the wide bandwidth PRS. Significantly, the wide bandwidth PRS is different from a conventional narrower (OFDM based) PRS for conventional NR positioning. Such differences are due to the fact that the signal generation for the wide bandwidth PRS does not rely on typical OFDM processing (i.e., it does not involve complex symbol generation, Inverse Fast Fourier Transform, IFFT, and up-conversion to a carrier). Instead, the pulses that the LMF selects for wideband positioning avoid the need for such complexities, since the UWB transmitter (i.e., UE for UL, gNBs for DL) is triggered to generate very short pulses, which, due to their wideband nature, do not undergo any OFDM-based processing or up-conversion. Consequently, the UWB receiver (i.e., gNB for UL, UE for DL) needs to be configured to measure such pulses by different means that of the typical reception of conventional OFDM positioning signals (such as NR PRS and SRS).

It will be understood that each block and combinations of blocks illustrated in FIGS. 2, 4-8 as well as the further functions described above, can be implemented by various means, such as hardware, firmware, and/or software including one or more computer program instructions. For example, one or more of the functions described can be performed by a duly configured apparatus (such as: a UE 110 or gNB 120, or LMF 140), comprising means for performing the described functions. Furthermore, one or more of the functions described can be embodied by a duly configured computer program (such as a computer program comprising computer program instructions which embody the functions described below and which can be stored by a memory storage device and performed by a processor).

As will be appreciated, any such computer program instructions can be loaded onto a computer or other programmable apparatus (i.e., hardware) to produce a machine, such that the instructions when performed on the programmable apparatus create means for implementing the functions specified in the blocks. These computer program instructions can also be stored in a computer-readable medium that can direct a programmable apparatus to function in a particular manner, such that the instructions stored in the computer-readable memory produce an article of manufacture including instruction means which implement the function specified in the blocks. The computer program instructions can also be loaded onto a programmable apparatus to cause a series of operational actions to be performed on the programmable apparatus to produce a computer-implemented process such that the instructions which are performed on the programmable apparatus provide actions for implementing the functions specified in the blocks.

Various, but not necessarily all, examples of the present disclosure can take the form of a method, an apparatus or a computer program. Accordingly, various, but not necessarily all, examples can be implemented in hardware, software or a combination of hardware and software.

Various, but not necessarily all, examples of the present disclosure are described using flowchart illustrations and schematic block diagrams. It will be understood that each block (of the flowchart illustrations and block diagrams), and combinations of blocks, can be implemented by computer program instructions of a computer program. These program instructions can be provided to one or more processor(s), processing circuitry or controller(s) such that the instructions which execute on the same create means for causing implementing the functions specified in the block or blocks, i.e., such that the method can be computer implemented. The computer program instructions can be executed by the processor(s) to cause a series of operational steps/actions to be performed by the processor(s) to produce a computer implemented process such that the instructions which execute on the processor(s) provide steps for implementing the functions specified in the block or blocks.

Accordingly, the blocks support: combinations of means for performing the specified functions; combinations of actions for performing the specified functions; and computer program instructions/algorithm for performing the specified functions. It will also be understood that each block, and combinations of blocks, can be implemented by special purpose hardware-based systems which perform the specified functions or actions, or combinations of special purpose hardware and computer program instructions.

Various, but not necessarily all, examples of the present disclosure provide both a method and corresponding apparatus comprising various modules, means or circuitry that provide the functionality for performing/applying the actions of the method. The modules, means or circuitry can be implemented as hardware, or can be implemented as software or firmware to be performed by a computer processor. In the case of firmware or software, examples of the present disclosure can be provided as a computer program product including a computer readable storage structure embodying computer program instructions (i.e., the software or firmware) thereon for performing by the computer processor.

Figure 9:
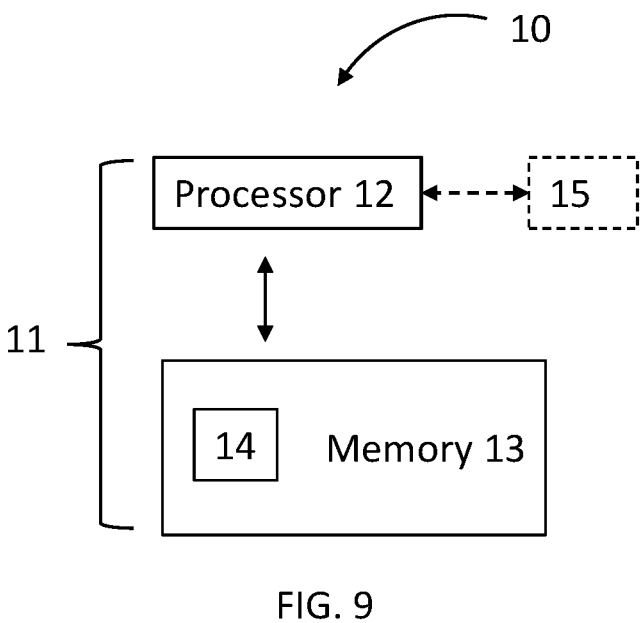
FIG. 9 shows another example of the subject matter described herein.

FIG. 9 schematically illustrates a block diagram of an apparatus 10 for performing the methods, processes, procedures and signaling described in the present disclosure and illustrated in FIGS. 2, 4-8. In this regard, in some examples the apparatus can perform the roles of a UE 110, in other examples it can perform the role of a gNB 120, and I yet other examples it can perform the role of the LMF with regards to the illustrated and described methods and signalling diagrams. The component blocks of FIG. 9 are functional and the functions described can be performed by a single physical entity.

The apparatus comprises a controller 11, which could be provided within a device such as a UE 110, a gNB node 120 or an LMF 140.

The controller 11 can be embodied by a computing device, not least such as those mentioned above. In some, but not necessarily all examples, the apparatus can be embodied as a chip, chip set or module, i.e., for use in any of the foregoing. As used here 'module' refers to a unit or apparatus that excludes certain parts/components that would be added by an end manufacturer or a user.

Implementation of the controller 11 can be as controller circuitry. The controller 11 can be implemented in hardware alone, have certain aspects in software including firmware alone or can be a combination of hardware and software (including firmware).

The controller 11 can be implemented using instructions that enable hardware functionality, for example, by using executable instructions of a computer program 14 in a general-purpose or special-purpose processor 12 that can be stored on a computer readable storage medium 13, for example memory, or disk etc, to be executed by such a processor 12.

The processor 12 is configured to read from and write to the memory 13. The processor 12 can also comprise an output interface via which data and/or commands are output by the processor 12 and an input interface via which data and/or commands are input to the processor 12. The apparatus can be coupled to or comprise one or more other components 15 (not least for example: a radio transceiver, sensors, input/output user interface elements and/or other modules/devices/components for inputting and outputting data/commands).

The memory 13 stores a computer program 14 comprising computer program instructions (computer program code) that controls the operation of the apparatus 10 when loaded into the processor 12. The computer program instructions, of the computer program 14, provide the logic and routines that enables the apparatus to perform the methods, processes and procedures described in the present disclosure and illustrated in FIGS. 2, 4-8. The processor 12 by reading the memory 13 is able to load and execute the computer program 14.

Although the memory 13 is illustrated as a single component/circuitry it can be implemented as one or more separate components/circuitry some or all of which can be integrated/removable and/or can provide permanent/semi-permanent/dynamic/cached storage.

Although the processor 12 is illustrated as a single component/circuitry it can be implemented as one or more separate components/circuitry some or all of which can be integrated/removable. The processor 12 can be a single core or multi-core processor.

The apparatus can include one or more components for effecting the methods, processes and procedures described in the present disclosure and illustrated in FIGS. 2, 4-8. It is contemplated that the functions of these components can be combined in one or more components or performed by other components of equivalent functionality. The description of a function should additionally be considered to also disclose any means suitable for performing that function. Where a structural feature has been described, it can be replaced by means for performing one or more of the functions of the structural feature whether that function or those functions are explicitly or implicitly described.

Although examples of the apparatus have been described above in terms of comprising various components, it should be understood that the components can be embodied as or otherwise controlled by a corresponding controller or circuitry such as one or more processing elements or processors of the apparatus. In this regard, each of the components described above can be one or more of any device, means or circuitry embodied in hardware, software or a combination of hardware and software that is configured to perform the corresponding functions of the respective components as described above.

The apparatus can, for example, be a client device, a server device, a mobile cellular telephone, a base station in a mobile cellular telecommunication system, a wireless communications device, a hand-portable electronic device, a location/position tag, a hyper tag etc. The apparatus can be embodied by a computing device, not least such as those mentioned above. However, in some examples, the apparatus can be embodied as a chip, chip set or module, i.e., for use in any of the foregoing.

In one example, the apparatus is embodied on a hand held portable electronic device, such as a mobile telephone, wearable computing device or personal digital assistant, that can additionally provide one or more audio/text/video communication functions (for example tele-communication, video-communication, and/or text transmission (Short Message Service (SMS)/Multimedia Message Service (MMS)/emailing) functions), interactive/non-interactive viewing functions (for example web-browsing, navigation, TV/program viewing functions), music recording/playing functions (for example Moving Picture Experts Group-1 Audio Layer 3 (MP3) or other format and/or (frequency modulation/amplitude modulation) radio broadcast recording/playing), downloading/sending of data functions, image capture function (for example using a (for example in-built) digital camera), and gaming functions.

In examples, e.g., where the apparatus is provided within a UE 110 or a gNB 120, the apparatus comprises:

at least one processor 12; and
at least one memory 13 including computer program code
the at least one memory 13 and the computer program code configured to, with the at least one processor 12, cause the apparatus at least to perform:

receiving Ultra-Wideband, UWB, Reference Signal, RS, configuration information, wherein the UWB RS configuration information comprises information for configuring a transmission or a reception of a UWB RS to or from at least one node of a Radio Access Network, RAN; and based at least in part on the received UWB RS configuration information, causing transmission or reception of the UWB RS to or from the at least one node of the RAN.

In examples where the apparatus is provided within an LMF 140, the apparatus comprises:

at least one processor 12; and
at least one memory 13 including computer program code
the at least one memory 13 and the computer program code configured to, with
the at least one processor 12, cause the apparatus at least to perform:

causing transmission, to an apparatus, of Ultra-Wideband, UWB, Reference Signal, RS, configuration information, wherein the UWB RS configuration information comprises information for configuring a transmission or a reception of a UWB RS by the apparatus to or from at least one node of a Radio Access Network, RAN.

According to some examples of the present disclosure, there is provided a system comprising at least one UE 110, at least one gNB 120 and at least one LNF as described above.

The above described examples find application as enabling components of: tracking systems, automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things (IOT); Vehicle-to-everything (V2X), virtualized networks; and related software and services.

The apparatus can be provided in an electronic device, for example, a mobile terminal, according to an example of the present disclosure. It should be understood, however, that a mobile terminal is merely illustrative of an electronic device that would benefit from examples of implementations of the present disclosure and, therefore, should not be taken to limit the scope of the present disclosure to the same. While in certain implementation examples, the apparatus can be provided in a mobile terminal, other types of electronic devices, such as, but not limited to, hand portable electronic devices, wearable computing devices, portable digital assistants (PDAs), pagers, mobile computers, desktop computers, televisions, gaming devices, laptop computers, cameras, video recorders, GPS devices and other types of electronic systems, can readily employ examples of the present disclosure. Furthermore, devices can readily employ examples of the present disclosure regardless of their intent to provide mobility.

Figure 10:
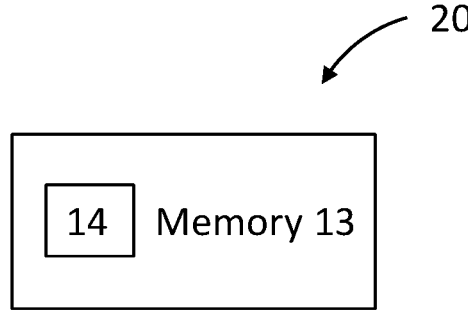
FIG. 10 shows another example of the subject matter described herein.

FIG. 10, illustrates a computer program 14 conveyed via a delivery mechanism 20. The delivery mechanism 20 can be any suitable delivery mechanism, for example, a machine-readable medium, a computer-readable medium, a non-transitory computer-readable storage medium, a computer program product, a memory device, a solid-state memory, a record medium such as a Compact Disc Read-Only Memory (CD-ROM) or a Digital Versatile Disc (DVD) or an article of manufacture that comprises or tangibly embodies the computer program 14. The delivery mechanism can be a signal configured to reliably transfer the computer program. An apparatus can receive, propagate or transmit the computer program as a computer data signal.

In certain examples of the present disclosure, there is provided computer program instructions for causing an apparatus (e.g., a UE 110 or a gNB 120) to perform at least the following or for causing performing at least the following:

receiving Ultra-Wideband, UWB, Reference Signal, RS, configuration information, wherein the UWB RS configuration information comprises information for configuring a transmission or a reception of a UWB RS to or from at least one node of a Radio Access Network, RAN; and based at least in part on the received UWB RS configuration information, causing transmission or reception of the UWB RS to or from the at least one node of the RAN.

In certain examples of the present disclosure, there is provided computer program instructions for causing an apparatus (e.g., an LMF 140) to perform at least the following or for causing performing at least the following:

causing transmission, to an apparatus, of Ultra-Wideband, UWB, Reference Signal, RS, configuration information, wherein the UWB RS configuration information comprises information for configuring a transmission or a reception of a UWB RS by the apparatus to or from at least one node of a Radio Access Network, RAN.

References to 'computer program', 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' can refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

Although specific terms are employed herein, they are used in a generic and descriptive sense only and not for purposes of limitation. Features described in the preceding description can be used in combinations other than the combinations explicitly described. Although functions have been described with reference to certain features, those functions can be performable by other features whether described or not. Although features have been described with reference to certain examples, those features can also be present in other examples whether described or not. Accordingly, features described in relation to one example/aspect of the disclosure can include any or all of the features described in relation to another example/aspect of the disclosure, and vice versa, to the extent that they are not mutually inconsistent.

Although various examples of the present disclosure have been described in the preceding paragraphs, it should be appreciated that modifications to the examples given can be made without departing from the scope of the invention as set out in the claims. For example, whilst the figures illustrate procedures and signalling for UL positioning, it is to be appreciated that examples of the present disclosure also extend to procedures and signalling for DL positioning.

The term 'comprise' is used in this document with an inclusive not an exclusive meaning. That is any reference to X comprising Y indicates that X can comprise only one Y or can comprise more than one Y. If it is intended to use 'comprise' with an exclusive meaning then it will be made clear in the context by referring to "comprising only one . . . " or by using "consisting".

As used herein, the term "determine/determining" (and grammatical variants thereof) can include, not least: calculating, computing, processing, deriving, measuring, investigating, identifying, looking up (for example, looking up in a table, a database or another data structure), ascertaining and the like. Also, "determining" can include receiving (for example, receiving information), accessing (for example, accessing data in a memory), obtaining and the like. Also, "determine/determining" can include resolving, selecting, choosing, establishing, and the like.

References to a parameter (not least for example measurement results) can be replaced by references to "data indicative of", "data defining" or "data representative of" the relevant parameter if not explicitly stated.

In this description, reference has been made to various examples. The description of features or functions in relation to an example indicates that those features or functions are present in that example. The use of the term 'example' or 'for example', 'can' or 'may' in the text denotes, whether explicitly stated or not, that such features or functions are present in at least the described example, whether described as an example or not, and that they can be, but are not necessarily, present in some or all other examples. Thus 'example', 'for example', 'can' or 'may' refers to a particular instance in a class of examples. A property of the instance can be a property of only that instance or a property of the class or a property of a sub-class of the class that includes some but not all of the instances in the class.

In this description, references to "a/an/the" [feature, element, component, means . . . ] are to be interpreted as "at least one" [feature, element, component, means . . . ] unless explicitly stated otherwise. That is any reference to X comprising a/the Y indicates that X can comprise only one Y or can comprise more than one Y unless the context clearly indicates the contrary. If it is intended to use 'a' or 'the' with an exclusive meaning then it will be made clear in the context. In some circumstances the use of 'at least one' or 'one or more' can be used to emphasise an inclusive meaning but the absence of these terms should not be taken to infer any exclusive meaning.

The presence of a feature (or combination of features) in a claim is a reference to that feature (or combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

In the above description, the apparatus described can alternatively or in addition comprise an apparatus which in some other examples comprises a distributed system of apparatus, for example, a client/server apparatus system. In examples where an apparatus provided forms (or a method is implemented as) a distributed system, each apparatus forming a component and/or part of the system provides (or implements) one or more features which collectively implement an example of the present disclosure. In some examples, an apparatus is re-configured by an entity other than its initial manufacturer to implement an example of the present disclosure by being provided with additional software, for example by a user downloading such software, which when executed causes the apparatus to implement an example of the present disclosure (such implementation being either entirely by the apparatus or as part of a system of apparatus as mentioned hereinabove).

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavouring in the foregoing specification to draw attention to those features of examples of the present disclosure believed to be of particular importance it should be understood that the applicant claims protection in respect of any patentable feature or combination of features hereinbefore referred to and/or shown in the drawings whether or not particular emphasis has been placed thereon.

The examples of the present disclosure and the accompanying claims can be suitably combined in any manner apparent to one of ordinary skill in the art. Separate references to an "example", "in some examples" and/or the like in the description do not necessarily refer to the same example and are also not mutually exclusive unless so stated and/or except as will be readily apparent to those skilled in the art from the description. For instance, a feature, structure, process, step, action, or the like described in one example may also be included in other examples, but is not necessarily included.

Each and every claim is incorporated as further disclosure into the specification and the claims are embodiment(s) of the present disclosure. Further, while the claims herein are provided as comprising specific dependencies, it is contemplated that any claims can depend from any other claims and that to the extent that any alternative embodiments can result from combining, integrating, and/or omitting features of the various claims and/or changing dependencies of claims, any such alternative embodiments and their equivalents are also within the scope of the disclosure.

We claim:

1. An apparatus comprising:
   at least one processor; and
   at least one memory including computer program instructions that, when executed by the processor, cause the apparatus to perform the following operations:
   receiving Ultra-Wideband (UWB) Reference Signal (RS) configuration information, wherein the UWB RS configuration information comprises information for configuring a transmission or a reception of a UWB RS by the apparatus to or from at least one node of a Radio Access Network (RAN), wherein the UWB RS configuration information is received from a Location Management Function (LMF) via a serving Next Generation Node B (gNB) while the apparatus is in a Radio Resource Control (RRC) idle state, and wherein the UWB RS configuration information specifies (i) a Gaussian monocycle pulse type, (ii) a pulse width of 1 nanosecond, (iii) a bandwidth of 499.2 megahertz centered at 6.8 gigahertz, (iv) a periodicity of 20 milliseconds, (v) a transmission time offset of four Orthogonal Frequency-Division Multiplexing (OFDM) symbols from a frame start, and (vi) a one-millisecond transmission window;
   receiving, on paging resources offset by four slots relative to standard paging, a trigger identified as an nr-UWB-RequestLocationInformation message; and
   based at least in part on the received UWB RS configuration information and responsive to the trigger, causing, using a UWB transceiver that shares a reference clock locked to New Radio (NR) and without transitioning the apparatus out of the RRC idle state, the transmission of exactly three identical UWB RS bursts within the one-millisecond window to exactly two Transmission Reception Points (TRPs) consisting of the serving gNB and one neighbor gNB, each burst conforming to the specified pulse type, width, bandwidth, center frequency, periodicity, and OFDM-symbol offset, wherein the UWB RS configuration information further indicates that the two TRPs perform Time of Arrival (TOA) and Angle of Arrival (AoA) measurements on the UWB RS and report results to the LMF.

2. The apparatus of claim 1, wherein each of the three Ultra-Wideband Reference Signal bursts comprises a preamble of 128 pulses followed by a 32-pulse payload encoding a fixed sequence identifier for the bursts.

3. The apparatus of claim 2, wherein the three identical Ultra-Wideband Reference Signal bursts are emitted with equal inter-burst spacing of approximately 333 microseconds within the one-millisecond transmission window, with a tolerance of ±5 microseconds.

4. The apparatus of claim 3, wherein the apparatus applies a transmit-power backoff of 10 decibels relative to a pre-configured maximum power for the Ultra-Wideband Reference Signal.

5. The apparatus of claim 4, wherein, prior to causing the transmission, the apparatus verifies that the shared reference clock is phase-aligned to a New Radio frame boundary within ±100 nanoseconds and defers transmission until the alignment is within said bound.

6. The apparatus of claim 5, wherein the computer program instructions further cause the apparatus to perform the following operation: transmitting, after the three bursts, a confirmation message to the Location Management Function via the serving Next Generation Node B that includes a local timestamp for each burst and identifiers for the serving Next Generation Node B and the neighbor Next Generation Node B.

7. The apparatus of claim 6, wherein each of the three UWB RS bursts comprises a time-hopping sequence of length thirty-two with a chip interval of two nanoseconds, the time-hopping code being identical across the three bursts and specified in the UWB RS configuration information.

8. A system comprising:
an apparatus;
at least one processor; and
at least one memory including computer program instructions that, when executed by the processor, cause the apparatus to perform the following operations:
receiving Ultra-Wideband (UWB) Reference Signal (RS) configuration information, wherein the UWB RS configuration information comprises information for configuring a transmission or a reception of a UWB RS by the apparatus to or from at least one node of a Radio Access Network (RAN), wherein the UWB RS configuration information is received from a Location Management Function (LMF) via a serving Next Generation Node B (gNB) while the apparatus is in a Radio Resource Control (RRC) idle state, and wherein the UWB RS configuration information specifies (i) a Gaussian monocycle pulse type, (ii) a pulse width of 1 nanosecond, (iii) a bandwidth of 499.2 megahertz centered at 6.8 gigahertz, (iv) a periodicity of 20 milliseconds, (v) a transmission time offset of four Orthogonal Frequency-Division Multiplexing (OFDM) symbols from a frame start, and (vi) a one-millisecond transmission window;
receiving, on paging resources offset by four slots relative to standard paging, a trigger identified as an nr-UWB-RequestLocationInformation message; and
based at least in part on the received UWB RS configuration information and responsive to the trigger, causing, without transitioning the apparatus out of the RRC idle state and using a UWB transceiver that shares a reference clock locked to New Radio (NR), the transmission of exactly three identical UWB RS bursts within the one-millisecond window to exactly two Transmission Reception Points (TRPs) consisting of the serving gNB and one neighbor gNB, each burst conforming to the specified pulse type, width, bandwidth, center frequency, periodicity, and OFDM-symbol offset, wherein the UWB RS configuration information further indicates that the two TRPs perform Time of Arrival (TOA) and Angle of Arrival (AoA) measurements on the UWB RS and report results to the LMF.

9. The system of claim 8, wherein each of the three Ultra-Wideband Reference Signal bursts comprises a preamble of 128 pulses followed by a 32-pulse payload encoding a fixed sequence identifier for the bursts.

10. The system of claim 9, wherein the three identical Ultra-Wideband Reference Signal bursts are emitted with equal inter-burst spacing of approximately 333 microseconds within the one-millisecond transmission window, with a tolerance of ±5 microseconds.

11. The system of claim 10, wherein the apparatus applies a transmit-power backoff of 10 decibels relative to a pre-configured maximum power for the Ultra-Wideband Reference Signal.

12. The system of claim 11, wherein, prior to causing the transmission, the apparatus verifies that the shared reference clock is phase-aligned to a New Radio frame boundary within ±100 nanoseconds and defers transmission until the alignment is within said bound.

13. The system of claim 12, wherein the computer program instructions further cause the apparatus to perform the following operation: transmitting, after the three bursts, a confirmation message to the Location Management Function via the serving Next Generation Node B that includes a local timestamp for each burst and identifiers for the serving Next Generation Node B and the neighbor Next Generation Node B.

14. The system of claim 13, wherein each of the three UWB RS bursts comprises a time-hopping sequence of length thirty-two with a chip interval of two nanoseconds, the time-hopping code being identical across the three bursts and specified in the UWB RS configuration information.

15. A method performed by a user equipment (UE), the method comprising:
receiving Ultra-Wideband (UWB) Reference Signal (RS) configuration information, wherein the UWB RS configuration information comprises information for configuring a transmission or a reception of a UWB RS by the UE to or from at least one node of a Radio Access Network (RAN), wherein the UWB RS configuration information is received from a Location Management Function (LMF) via a serving Next Generation Node B (gNB) while the UE is in a Radio Resource Control (RRC) idle state, and wherein the UWB RS configuration information specifies (i) a Gaussian monocycle pulse type, (ii) a pulse width of 1 nanosecond, (iii) a bandwidth of 499.2 megahertz centered at 6.8 gigahertz, (iv) a periodicity of 20 milliseconds, (v) a transmission time offset of four Orthogonal Frequency-Division Multiplexing (OFDM) symbols from a frame start, and (vi) a one-millisecond transmission window;

receiving, on paging resources offset by four slots relative to standard paging, a trigger identified as an nr-UWB-RequestLocationInformation message; and based at least in part on the received UWB RS configuration information and responsive to the trigger, causing, without transitioning the UE out of the RRC idle state and using a UWB transceiver that shares a reference clock locked to New Radio (NR), the transmission of exactly three identical UWB RS bursts within the one-millisecond window to exactly two Transmission Reception Points (TRPs) consisting of the serving gNB and one neighbor gNB, each burst conforming to the specified pulse type, width, bandwidth, center frequency, periodicity, and OFDM-symbol offset, wherein the UWB RS configuration information further indicates that the two TRPs perform Time of Arrival (TOA) and Angle of Arrival (AoA) measurements on the UWB RS and report results to the LMF.

16. The method of claim 15, wherein each of the three Ultra-Wideband Reference Signal bursts comprises a preamble of 128 pulses followed by a 32-pulse payload encoding a fixed sequence identifier for the bursts.

17. The method of claim 16, wherein the three identical Ultra-Wideband Reference Signal bursts are emitted with equal inter-burst spacing of approximately 333 microseconds within the one-millisecond transmission window, with a tolerance of ±5 microseconds.

18. The method of claim 17, further comprising applying a transmit-power backoff of 10 decibels relative to a preconfigured maximum power for the Ultra-Wideband Reference Signal.

19. The method of claim 18, wherein, prior to causing the transmission, the UE verifies that the shared reference clock is phase-aligned to a New Radio frame boundary within ±100 nanoseconds and defers transmission until the alignment is within said bound.

20. The method of claim 19, further comprising transmitting, after the three bursts, a confirmation message to the Location Management Function via the serving Next Generation Node B that includes a local timestamp for each burst and identifiers for the serving Next Generation Node B and the neighbor Next Generation Node B, and wherein each of the three UWB RS bursts comprises a time-hopping sequence of length thirty-two with a chip interval of two nanoseconds, the time-hopping code being identical across the three bursts and specified in the UWB RS configuration information.

* * * * *